(12) United States Patent
Freeny, Jr.

(10) Patent No.: US 7,743,114 B1
(45) Date of Patent: Jun. 22, 2010

(54) AUTOMATED DATA DELIVERY SYSTEMS

(75) Inventor: Charles C. Freeny, Jr., Grand Prairie, TX (US)

(73) Assignee: Automated Business Companies, Spring, TX (US)

(*) Notice: Subject to any disclaimer, the term of this patent is extended or adjusted under 35 U.S.C. 154(b) by 2124 days.

(21) Appl. No.: 09/607,227

(22) Filed: Jun. 30, 2000

(51) Int. Cl.
*G06F 15/16* (2006.01)

(52) U.S. Cl. .................. 709/218; 345/354; 345/352; 137/486

(58) Field of Classification Search .......... 709/218, 709/224; 345/840, 354, 352; 379/67.1; 137/486
See application file for complete search history.

(56) References Cited

U.S. PATENT DOCUMENTS

| | | | |
|---|---|---|---|
| 4,837,797 A | | 6/1989 | Freeny, Jr. |
| 5,063,507 A | * | 11/1991 | Lindsey et al. ............... 705/26 |
| 5,465,291 A | * | 11/1995 | Barrus et al. ............... 379/67.1 |
| 6,028,605 A | * | 2/2000 | Conrad et al. ............... 345/840 |
| 6,363,362 B1 | * | 3/2002 | Burfield et al. ............... 705/40 |
| 6,363,958 B1 | * | 4/2002 | Ollivier ..................... 137/2 |
| 6,392,565 B1 | * | 5/2002 | Brown ..................... 340/988 |
| 6,515,681 B1 | * | 2/2003 | Knight ..................... 345/751 |
| 6,542,813 B1 | * | 4/2003 | Kovacs ..................... 701/208 |
| 6,571,234 B1 | * | 5/2003 | Knight et al. ............... 707/3 |
| 6,604,138 B1 | * | 8/2003 | Virine et al. ............... 709/224 |

OTHER PUBLICATIONS

Wall Street Journal; May 15, 2000; Starting Gate, by Don Clark—"Partner Platform"; p. 1.

* cited by examiner

*Primary Examiner*—Thanh Tammy Nguyen
(74) *Attorney, Agent, or Firm*—Dunlap Codding, P.C.

(57) ABSTRACT

The Automated Data Delivery Systems (ADDS) are two delivery systems designed to either deliver specific data to customer computers over a network such as the Internet or from one application program to another application program. In both cases the user computer requesting data delivery can either have an automatic data reception capability or receive the data without screening the incoming data. In particular, ADDS are systems that allow data delivery services to be offered on the Internet or an Intranet between two Internet/Intranet sites (I2I) or a data delivery service to be offered between an Internet site and a User Computer (I2U). In addition the ADDS invention includes a modification to existing or future application programs that allow the program to deliver 1) specified data 2) in the format specified by the user 3) to the location specified by the user, and 4) at a schedule specified by the user.

168 Claims, 7 Drawing Sheets

AUTOMATED DATA DELIVERY SYSTEMS

BACKGROUND AND PRIOR ART

There are many systems developed to deliver items from one source or a distribution point to another location including data and information distributions systems. More notable of the prior art delivery systems are the Government Mail systems, Private Mail Systems such as Fed EX and UPS and in more recent years the Electronic Fax machines (such as U.S. Pat. No. 4,837,797) and the many E-Mail services evolving on the Internet and Intranets.

Also, the scheduled broadcast networks, such as Radio, television, telephone, and wireless networks that connect security and other automated equipment to computer systems have been around for years. The scheduled broadcast networks deliver data.

These legacy scheduled data delivery systems, such as Broadcast and cable TV systems, were designed for specialized equipment and delivered audio/video or data to either a public audience with special receiver equipment or a very limited audience with special equipment. For example, stock market quotes have been delivered to special pieces of equipment tuned into a local FM radio station and recently a company called "Netpliance" built a special piece of equipment that plugs into a persons phone line (like a fax machine) and delivers E-mail and other such information several times a day.

Over the last five years many of the legacy scheduled delivery systems converted over to Internet storage and delivery systems. More recently, public broadcast station content has been converted to Internet protocol for delivery to person's computers that tune into a Website broadcast station or Cable network such as CNN.com or CNN Channel 34 for example.

Even more recently, Internet Service Providers such as AOL have offered Instant message service that allows a new message to be delivered in real time to another persons computer that is connected to their service rather than just sending the message to the individuals E-Mail Box. That is, the Instant message service keeps track of who is signed up for the service and will send a message directly between several people signed up for the instant message service when they are connected to the service at the same time. This is kind of like a special party line chat room. However, none of these services send messages to a users database automatically so that the user can check their messages at anytime without having to connect up to some service provider to get what is in their service provider mail box. Currently, the network data services deliver only to a users E-Mail or Storage box located on the Internet or Intranet servers, or to a user's communication device, such as a cell phone or beeper.

The communication message deliver services (Beepers, Faxes, E-mail etc) that send messages or phone numbers have been around for years but only deliver to the user's communication device (or mail boxes stored on a remote server). The user has little or no involvement in determining what is delivered or how the data is delivered. For example in Los Angeles, a user can subscribe to a service that beeps the user's communication device when a live car chase is on TV. The service will beep you with the channel information for a fixed amount of money per month. The service can also beep the user's communication device when the user's stock has changed price.

Although there are now millions of databases available on the Internet, users still have to sort through the databases and select what the user's want to download or buy or watch the data in real time. Adding to the difficulties, the data storage services store the data in a single format (normally in one of the accepted browser formats) and users must figure out how to retrieve the data and convert the data to a format that fits their needs. In other words, the user must build a special data fetch engine for each source of data that the user needs at the user's computer.

Note the Internet/Intranet network systems themselves maintain IP address databases that must be maintained and synchronized. The IP address databases are maintained and synchronized by the routers and server synchronization programs and do not offer data delivery to Users. That is, the IP address databases are maintained and synchronized by automatic host- to-host database manager programs residing on the same network system (such as the many internal computer engines that keep local computer routines synchronized automatically to the correct time or other common platform parameters as required).

Applications such as Lotus, Excel, WordPerfect, MS Word, Access, and even more important the newer useful programs such as Quicken notebook and DacEasy or Peachtree Accounting programs or TurboTax have file or record Import/Export features that require the data to conform to some ODBC standard or the application file or record communication standards built into the programs. The most useful of these programs have "manual tools" to help import selected portions of files (records e.g. MS Word lets users "manually merge" address data records from one program database into a letter or a label generating program of another application). These export/import features were incorporated in to application programs many years ago because of competition. The available methods require the user to build a special program to retrieve the data (a fetch engine) or to deliver the data (a delivery engine) each time the user wants to transfer data from one program to another as done with the "tools macros" available in some of the more popular application programs.

These tool macros still require the user to learn how to use the tool and follow the instructions each time the user wants to import or export a file or record. Even though Windows software has provided menus designed to help the programmer accomplish file and record transfer tasks, Windows programs do not have an application module for scheduled specific data delivery or data reception built into their programs where the user specifies the format for example.

Report generators are prevalent in accounting and other application programs. The report generators operate as a special data base application program building a special database using a special report generating fetch engine but not a delivery engine. The report generators make it easy for user computer developers to specify the data or record they want (not specify a file but specify a piece of a file or record), in the form they want it (ASCII, html, excel, etc.), placed where they want the data to go, and to retrieve the data automatically, when they want it delivered. The report generator requires the user or the user's program to actuate the report generator each time data is to be determined.

There are some programs currently built to synchronize files (bring all the files up to the most current version) used for portable computers, PDA's and client computers hooked up to networks. Also there are a few companion application programs (applications developed by the same developer) such as Quicken Books and Turbo Tax programs developed by the same company that will let the user choose to import some data from one of the programs to the other. These programs import (data predetermined by the programmer not the user) from one program to another (e.g. from the Quicken Books database to the Turbo Tax program database) and let the user decide if the user wants to use the imported data.

Also there are many programs now that will let you retrieve updates with the latest software versions if you sign up for such a service, especially computer operating system programs running on Windows Platforms. Such programs are a convenience to the software developer but hardly a convenience for the software owner. These version update programs detect your current program version and provide an update automatically. The version update programs are just another form of synchronization programs not data delivery services. For example, AOL provides their program version updates when you try to log off from their service.

Search engines used by websites for mining data for a user exist. Such search engines are referred to in the art as agents, spiders or bots, for example. In addition, combinations of search engine and file transfer programs exist for use with downloading music from websites on the internet. Two such programs are provided under the tradenames Napister and Guntella.

SUMMARY OF THE INVENTION

The Automated Data Delivery Systems (ADDS) are two delivery systems designed to either deliver specific data to customer computers over a network such as the Internet or from one application program to another application program. In both cases the user computer requesting data delivery can either have a predetermined automatic data reception capability or receive the data with out screening the incoming data.

In particular, ADDS are systems that allow a data delivery services to be offered on the Internet or an Intranet between two Internet/Intranet sites (I2I) or a data delivery service to be offered between an Internet site and a User Computer (I2U). In addition the ADDS invention includes a modification to existing or future application programs that allow the application program to deliver 1) specified data 2) in the format specified by the user 3) to the location specified by the user, and 4) at a schedule specified by the user. Thus, the data is delivered to the location specified by the user by the application programs so that the data is available to the user in the specified location when the user wants to review or use such data in another program.

The delivery of data on the internet functions in a similar manner as the delivery of data from the application program. However, in the case of Internet delivery, the Website may charge a specified price for the delivery service. In addition I2I and I2U delivery services are described that offer both a scheduled data delivery service (e.g. deliver the Dow Jones ever 2 seconds in a predetermined selectable set of formats) or User specified delivery services where the price for the scheduled delivery is less than the user specified delivery service.

The ADDS systems will allow user computers program developers for businesses and individuals to focus on meeting the user requirements for data rather than spending much time building fetch engines for data as currently required.

Also users can have automatic features in their user computers such as "Auto E-Mail" where all of the users e-mail out going and incoming is both sent from and delivered to the user computer local e-mail data base and privacy on the web becomes a reality plus collecting mail from multiple E-Mail boxes becomes virtual to the user. In the past, computer users had to go get their E-mail from an E-Mail application program database, often located on the Internet/intranet unless they bought a special piece of equipment such as the "Netpliance" mentioned earlier. ADDS makes many more features available to users automatically and does not require users to spend time surfing the web for information.

DESCRIPTION OF THE INVENTION

Figure 1:
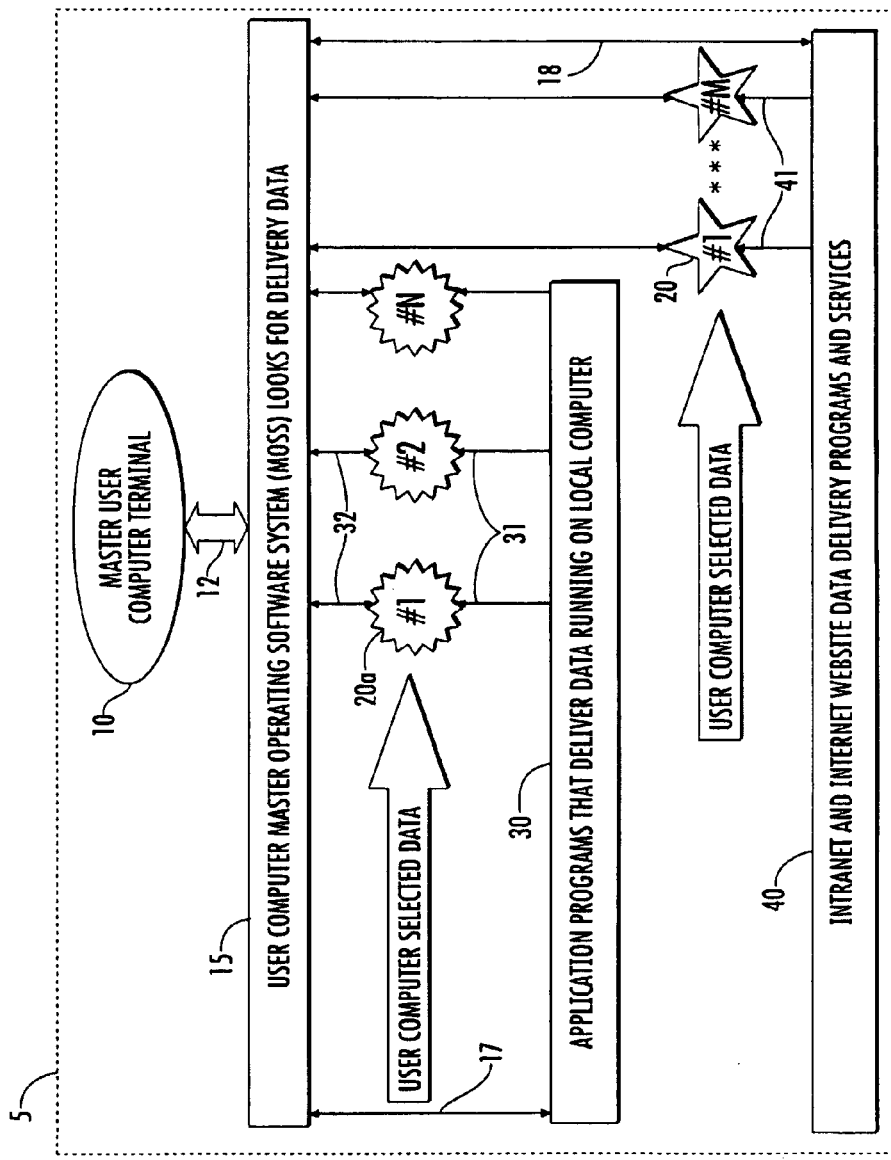
FIG. 1 is a block diagram illustrating a data delivery system constructed in accordance with the present invention.

Referring now to FIG. 1, shown therein is a block diagram of an automated data delivery system 5 constructed in accordance with the present invention. The automated data delivery system 5 is provided with a master user computer terminal 10, a user computer 15, an application program 30 running on either the user computer 15 or another computer (not shown) and a website/network 40. The users computer 15 has at least two databases with each database having a user computer database location. As will be discussed in more detail below, the application program 30 and/or the website/network 40 repeatedly deliver data to the users computer 15 to update at least one of the databases on the users computer 15.

As will be discussed in more detail below with reference to FIGS. 4, 5, 6 and 7, to set up the application program 30 and/or the website/network 40 to delivery data to the users computer 15, a menu of available data to be delivered, including a selection list of available predetermined specifications for delivering data automatically, is provided to the users computer 15 via either a signal path 17 or a signal path 18. At least one of the predetermined specifications for delivering data allows the user to specify at least one of the user computer database locations for the data to be delivered. The application program 30 and/or the website/network 40 receives a user's selection of data to be delivered from the application program 30 or the website/network 40 to the users computer 15 based on the menu of available data, and a user's selection of at least one set of predetermined data delivery specifications. The application program 30 or the website/network 40 outputs, automatically and repeatedly, the data identified by the user's selection to the users computer 15 based on the at least one set of predetermined data delivery specifications. For purposes of clarity, the data being delivered from the application program 30 is designated in FIG. 1 with the reference numeral 20*a*, and the data being delivered from the website/network 40 is designated in FIG. 1 with the reference numeral 20.

The term "engine" as used herein refers to the software and/or hardware utilized to accomplish the logic and/or purposes described herein.

The term "signal path", as used herein can be logical and/or physical links between various software and/or hardware utilized to implement the present invention. The physical links could be air-way or cable communication links. It should be understood that each of the signal paths are shown and described separately herein for the sole purpose of clearly illustrating the information and logic being communicated between the individual components of the present invention. When the invention is implemented, the signal paths may not be separate signal paths but may be a single signal path or multiple signal paths. In addition, it should be understood that the various information does not always have to flow between the components of the present invention in the exact manner shown provided the information is generated and received to accomplish the purposes set forth herein.

The user computer 15 and the master user computer terminal 10 can be a standard desk-top computer such as a HP 4530 Pavilion operating with the Windows 2000 operating system. The master user computer terminal 10 and the user computer 15 can either be at the same location, or remotely located as described in detail in U.S. Ser. No. 09/014,859, the entire content of which is hereby incorporated herein by reference. Where the master user computer terminal 10 and the user computer 15 are remotely located, the master user computer terminal 10 can be at multiple various world wide locations and connected to the user computer 15, which is located on a network server at some predetermined location and is connected via a signal path 12 to the master user computer terminal 10. In this version of the present invention, the master user terminal 10 and the user computer 15 can communicate with a two way communication link such as a telephone, cable network modem and combinations thereof. The predetermined data delivery specifications for delivering the data 20a and 20 are further described in connection with FIGS. 4, 5, 6, and 7.

As will be discussed in more detail with reference to FIG. 6, the requested data 20a can be delivered directly from the application program 30 to the users computer 15 without any virus, error or protocol checking via the signal paths 31 and 31a. Alternatively, the requested data 20a can be checked for predetermined protocol and virus protection requirements each time data is delivered as further described in connection with FIG. 6. In this last example, the data 20a is delivered via signal pathes 31 and 32. The requested data 20a is represented by #1, #2 * * * #N in FIG. 1 to indicate a plurality of data requests may be delivered by a single application program 30 or multiple application programs 30 as further described in connection with FIG. 2.

The requested data 20a can be delivered directly from the website/network 40 without any virus, error or protocol checking as indicated by the signal pathes 41 and 41a. Alternatively, the requested data 20a can be checked for predetermined protocol and virus protection requirements each time data is delivered as further described in connection with FIG. 7. In this last example, the requested data is delivered via signal pathes 41 and 42. The data 20a is represented by #1, * * * #M to indicate a plurality of data requests may be delivered by a single network program associated with the website/network 40 or multiple network programs associated with the website/network 40 as further described in connection with FIG. 3.

Figure 2:
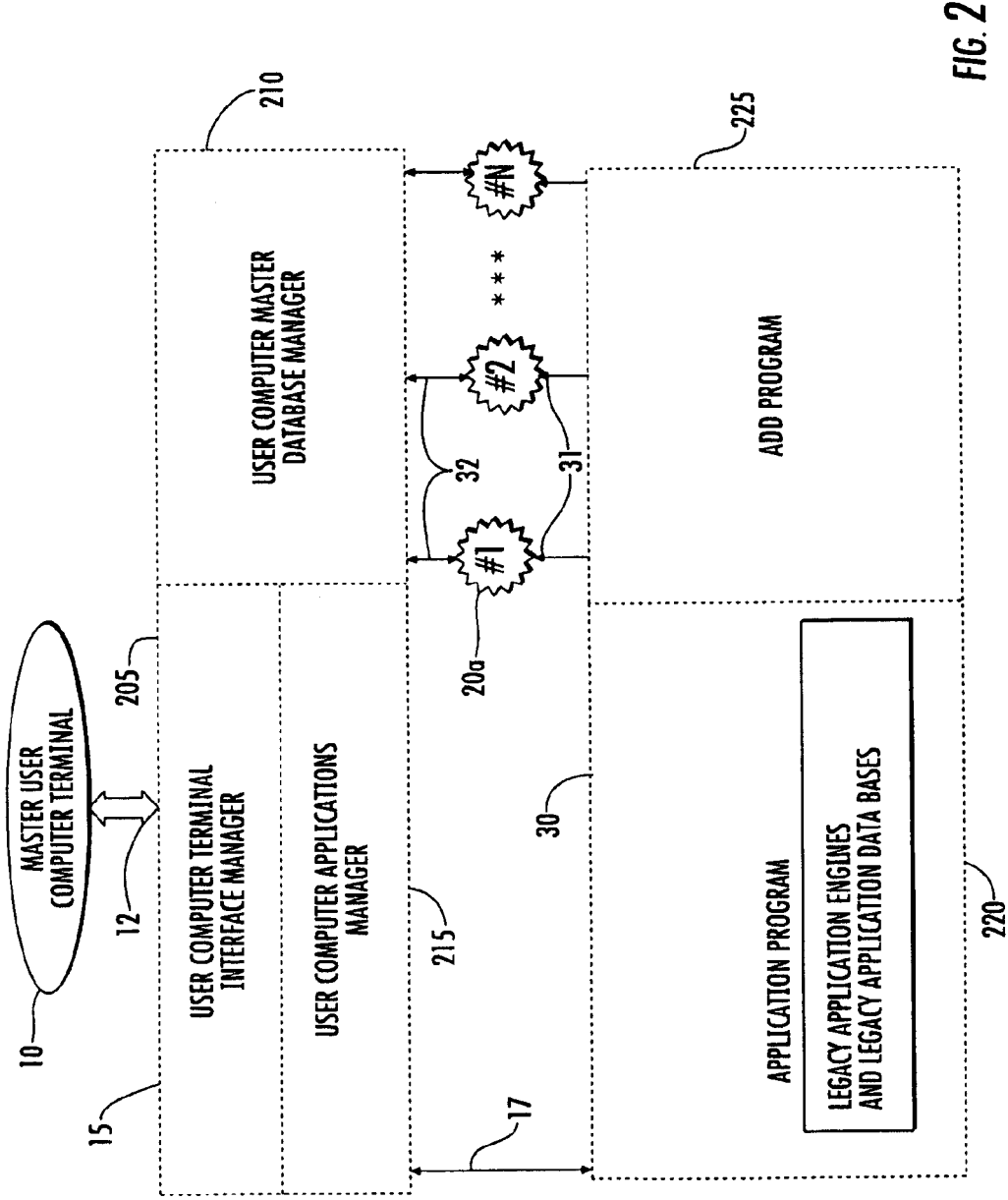
FIG. 2 is a block diagram illustrating an application program having an automated data delivery program incorporating features of the present invention.

Referring now to FIG. 2, shown therein is a block diagram illustrating the user computer 15 and the application program 30 in more detail. Software stored on a computer readable medium associated with the user computer 15 and/or hardware of the user computer 15 can be described in terms of three managers, i.e. a user computer terminal interface manager 205, a user computer master database manager 210 and a user computer applications manager 215. The software on the user computer 15 can be an application program which has been adapted to use a data delivery service as described herein, or multiple application programs residing on or associated with the user computer 15. For example, the application program(s) could be stored on a network server and downloaded by the user computer 15.

A complete description of the user computer terminal interface manager 205, the user computer master database manager 210 and the user computer applications manager 215 is provided in U.S. Ser. No. 60/186,874, the entire content of which is hereby expressly incorporated herein by reference. However, it should be understood that the user computer terminal interface manager 205, the user computer master database manager 210 and the user computer applications manager 215 can be implemented in numerous application programs other than those disclosed in U.S. Ser. No. 60/186,874 and required to build user computer programs.

In general, the user computer terminal interface manager 205 can be any software and/or hardware that functions to receive, format and transmit data to the master user computer terminal 10 via the signal path 12. The signal path 12 can be a cable or a wireless communication link. The master user computer terminal 10 can be a display, such as a monitor, a television, a mobile telephone or a personal data assistant, for example, and any input/output devices for inputting or outputting data, such as a printer, a keyboard, a microphone, or a mouse, for example.

The user computer terminal interface manager 205 allows user requests for data to be entered as described in connection with FIG. 4 and FIG. 6 when the user computer applications manager 215 connects to the application program 30 that has been modified or designed to include an automated data delivery (ADD) program 225. The application program 30 includes at least one legacy portion 220 that performs the useful functions, which are beneficial to the user of the application program 30. The legacy portion 220 creates and maintains an application database that is familiar with all application program developers. The application database is completely separate from the user computer master database manager 210.

The data available for delivery from the application program 30 is controlled by the ADD program 225. The ADD program 25 is further described in connection with FIG. 6, and the selection menus offered to the user computer applications manager 215 via the signal path 17 are further described with the aid of FIG. 4. The actual data 20a is delivered via signal paths 31 and 31a or 31 and 32 as discussed in connection with FIG. 6 to the user computer master database manager 210 that looks for data requested by the user computer application manager 215 via signal path 17 when automatic data reception features are built in to the browser program of the users computer 15 or a program such as PC anywhere is used to automatically answer incoming calls and filter Protocols.

Figure 4:
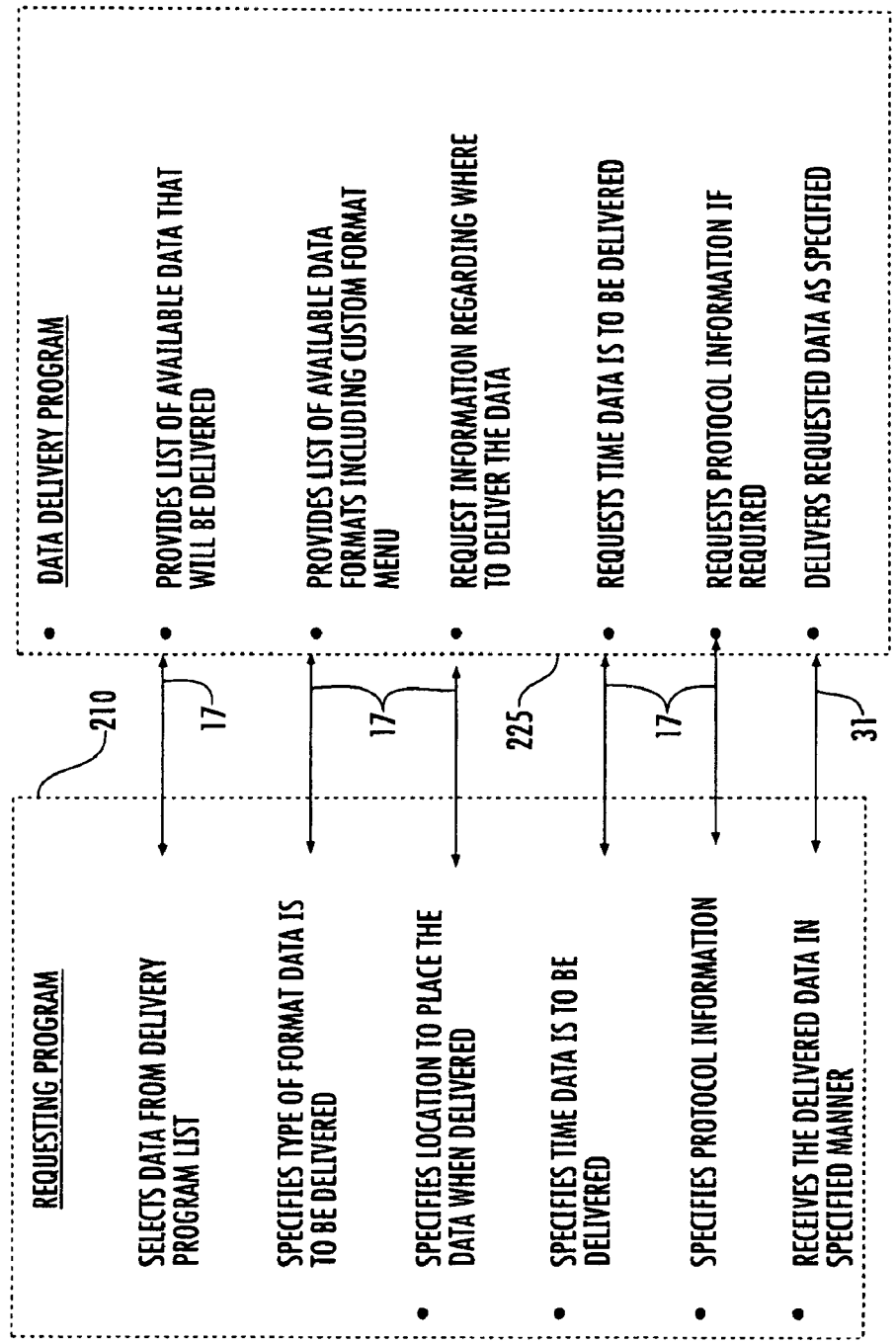
FIG. 4 is a logic flow diagram illustrating the information transmitted between the automated data delivery program associated with an application program and a requesting program.

Each time a request is made to the ADD program 225, the information described in connection with FIG. 4 is sent to the user computer master database manager 210 by the user computer applications manager 215 so that the proper communication via signal paths 31 and 31a or 31 and 32 can be established automatically between the user computer master database manager 210 and the ADD program 225 at the requested time of delivery, as described in further detail in connection with FIG. 6.

Figure 3:
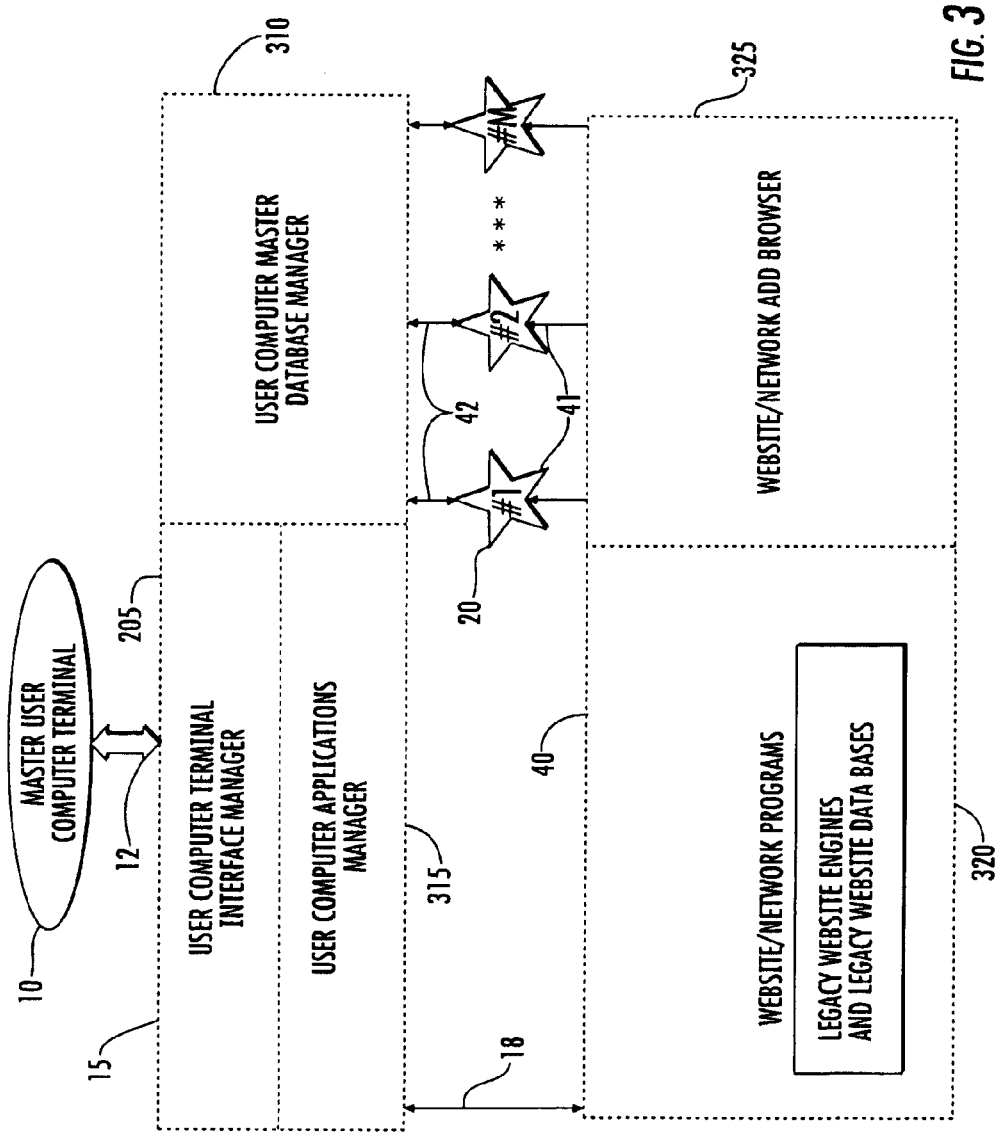
FIG. 3 is a block diagram of a Website/Network with an automated data delivery program servicing a user computer.

Referring now to FIG. 3, shown therein is a block diagram illustrating the user computer 15 and the website/network in more detail. The user computer 15, which receives the data 20 from the website/network 40 can be further described in terms of three managers, i.e. a user computer terminal interface manager 305, a user computer master database manager 310 and a user computer applications manager 315.

The user computer terminal interface manager 305, the user computer master database manager 310 and the user computer applications manager 315 are similar in construction and function to the user computer terminal interface manager 205, the user computer master database manager 210 and the user computer applications manager 215, except that the user computer terminal interface manager 305, the user computer master database manager 310 and the user computer applications manager 315 are designed to function in an Internet/Intranet environment. For example, the user computer applications manager 315 can be a browser program such as Internet Explorer manufactured and sold by Microsoft, Inc.

The user computer terminal interface manager 305 allows user requests for data to be entered as described in connection with FIG. 5 when the user computer applications manager 315 connects to an application program operating on the website/network 40. The website/network 40 can be a computer operating on an Intranet or the Internet that has been modified or designed to include a network automated data delivery (ADD) program 325 associated with the website/network 40.

The website/network 40 has at least one legacy portion 320 that performs the useful functions beneficial to a user. The legacy portion 320 includes an application engine that creates and maintains the application databases familiar to network application program developers and described in more detail in connection with FIG. 7. The legacy portion 320 and the application databases created and maintained thereby are completely separate from the user computer master database manager 310.

The data available for delivery from the website/network 40 is controlled by the network ADD program 325. The selection menus offered to the user computer application manager 315 via signal path 18 are discussed in further detail with the aid of FIG. 5. The actual data 20 is delivered via signal paths 41 and 41a or 41 and 42 as discussed in connection with FIG. 7 to the user computer master database manager 310 that looks for data requested by the user computer applications manager 315 when automatic data reception features are built into the user computer applications manager 315 of the users computer 15. Each time a request is made to the network ADD program 325 the information described in connection with FIG. 5 is sent to the user computer master database manager 310 by the user computer applications manager 315 so that the proper communication via signal paths 41 and 41a or 41 and 42 is established automatically between the user computer master database manager 310 and the network ADD program 325 at the requested time of delivery.

In FIG. 4 six basic functions performed by the ADD program 225 and the user computer application manager 215 of the users computer 15 are identified along with the signal paths 17 or 31 used to effect the functions therebetween. The computer programs or logic that perform these functions are described in more detail in connection with FIG. 6.

The program functions for the ADD program 225 of the application program 30 can be implemented starting with a menu of available data to be delivered. The menu can be written by persons skilled in the art of object programming in a language such as C++ or using Visual Basic and passing the menu to the user computer application manager 215 as discussed in connection with FIG. 6.

The initial step in the ADD program 225 shown in FIG. 4 after the user computer application manager 215 connects to the ADD program 225 via the signal path 17 is to provide the menu of available data located in the database associated with the application engine 220 to the user computer application manager 215 via the signal path 17. Data representing the menu of available data is then passed to the user computer terminal interface manager 205 which in turn passes the list to the master user computer terminal 10 via the signal path 12. In response thereto, the master user computer terminal 10 outputs the menu of available data in a format perceivable by the user.

When the user selects the desired data from the list using the master user computer terminal 10 the user's selection of data to be delivered is sent back to the ADD program 225 in the reverse steps used to send the data selection menu to the user. In addition the user computer applications manager 215 sends the selected information to the user computer master database manager 210 so that the user computer master database manager 210 is prepared to accept the selected data to be delivered.

Upon receiving and recording the user's selection of data to be delivered from the application program 30, the ADD program 225 then automatically steps to a selection list of available predetermined specifications for delivering the data automatically. More specifically, the ADD program 225 provides a list of available data formats that the ADD program 225 can deliver the selected data to the user computer applications manager 215 via the signal path 17.

The data formats are then passed to the user computer terminal interface manager 205 which in turn passes the list to the master user computer terminal 10 via the signal path 12. The master user computer terminal 10 receives the list and outputs the list in a format perceivable by the user. When the user selects the desired data format from the list using the master user computer terminal 10 the data format selection is sent back to the ADD program 225 in the reverse steps used to send the data format selection list to the user. In addition the user computer application manager 215 sends the selected information to the user computer master database manager 210 to cause the user computer master database manager 210 to prepare to accept the selected data to be delivered in the selected data format.

Upon receiving and recording the selected data format selection, the ADD program 225 then automatically steps to the next function in the selection list of available predetermined functions for delivering data automatically to request the user computer database location that the ADD program 225 can deliver the selected data to the user computer master database manager 210 via the signal path 31 and 31a or 31 and 32. The request for the location address of the user computer database is received by the user computer applications manager and then passed to the user computer terminal interface manager 205, which in turn passes the request to the master user computer terminal 10 via the signal path 12. In response thereto, the master user computer terminal 10 outputs the request in a format perceivable by the user, such as audio and/or video.

When the user specifies the desired user computer database location using the master user computer terminal 10, the location information is sent back to the ADD program 225 in the reverse steps used to send the request for location information to the user. In addition the user computer application manager 215 sends the selected information to the user computer master database manager 210 so that the user computer master database manager 210 is prepared to accept the selected data in the user computer database location to be delivered.

Upon receiving and recording the user computer database location to deliver the data, the ADD program 225 then automatically steps to the next function in the selection list of available predetermined functions for delivering data automatically to request the delivery schedule, i.e. the time or time periods that the ADD program 225 should deliver the selected data to the user computer master database manager 210 via the signal paths 31 and 31a or 31 and 32. The request for the delivery schedule is received by the user computer applications manager 215 and then passed to the user computer terminal interface manager 205 which in turn passes the request to the master user computer terminal 10 via the signal path 12. In response thereto, the master user computer terminal 10 outputs the request in a format perceivable by the user, such as audio and/or video.

When the user specifies the desired delivery schedule, i.e. the time or time periods using the master user computer terminal 10 the delivery schedule information is sent back to the ADD program 225 in the reverse steps used to send the request for the delivery schedule information to the user. In addition, the user computer application manager 215 sends the selected information to the user computer master database manager 210 so that the user computer master database manager 210 is prepared to accept the selected data at the correct time the data is to be delivered Upon receiving and recording the delivery schedule, the ADD program 225 then automatically steps to the next function in the selection list of available predetermined functions for delivering data automatically. A request for the communication protocol for deliverying data (e.g., the communication protocol that the ADD program 225 should use when communicating with the user computer master database manager 210 via the signal paths 31 and 31a or 31 and 32) is transmitted to the user computer application manager 215 via the signal path 17. The protocol information request is sent to the user computer terminal interface manager 205, which in turn passes the request to the master user computer terminal 10 via the signal path 12. In response thereto, the master user computer terminal 10 outputs the request in a format perceivable by the user.

When the user specifies the desired protocol using the master user computer terminal 10, the desired protocol information is sent back to the ADD program 225 in the reverse steps used to send the request for delivery time information to the user. In addition the user computer applications manager 215 sends the desired protocol information to the user computer master database manager 210 so that the user computer master database manager 210 is prepared to accept the selected data to be delivered.

Upon receiving and recording the desired protocol information, the ADD program 225 then automatically prepares to step to the run time function and the ADD program 225 prepares to deliver the data identified by the user's selection to the users computer 15 via the signal paths 31 and 31a or 31 and 32 based on the at least one set of predetermined data delivery specifications, i.e. the selected data format, the selected user database location, the selected delivery schedule, the selected protocol and combinations thereof. The ADD program 225 then outputs automatically the data identified by the user's selection to the users computer 15 based on the at least one set of predetermined data delivery specifications. If desired, the user's selection of the delivery schedule, i.e., the time or time periods, can indicate that the user wishes to have the data delivered automatically to the users computer 15 at a starting time, and at a predetermined time period thereafter. For example, the user's selection could indicate that the data is to be delivered the following day at 6:00 a.m., and then updated thereafter at five-minute intervals.

Figure 5:
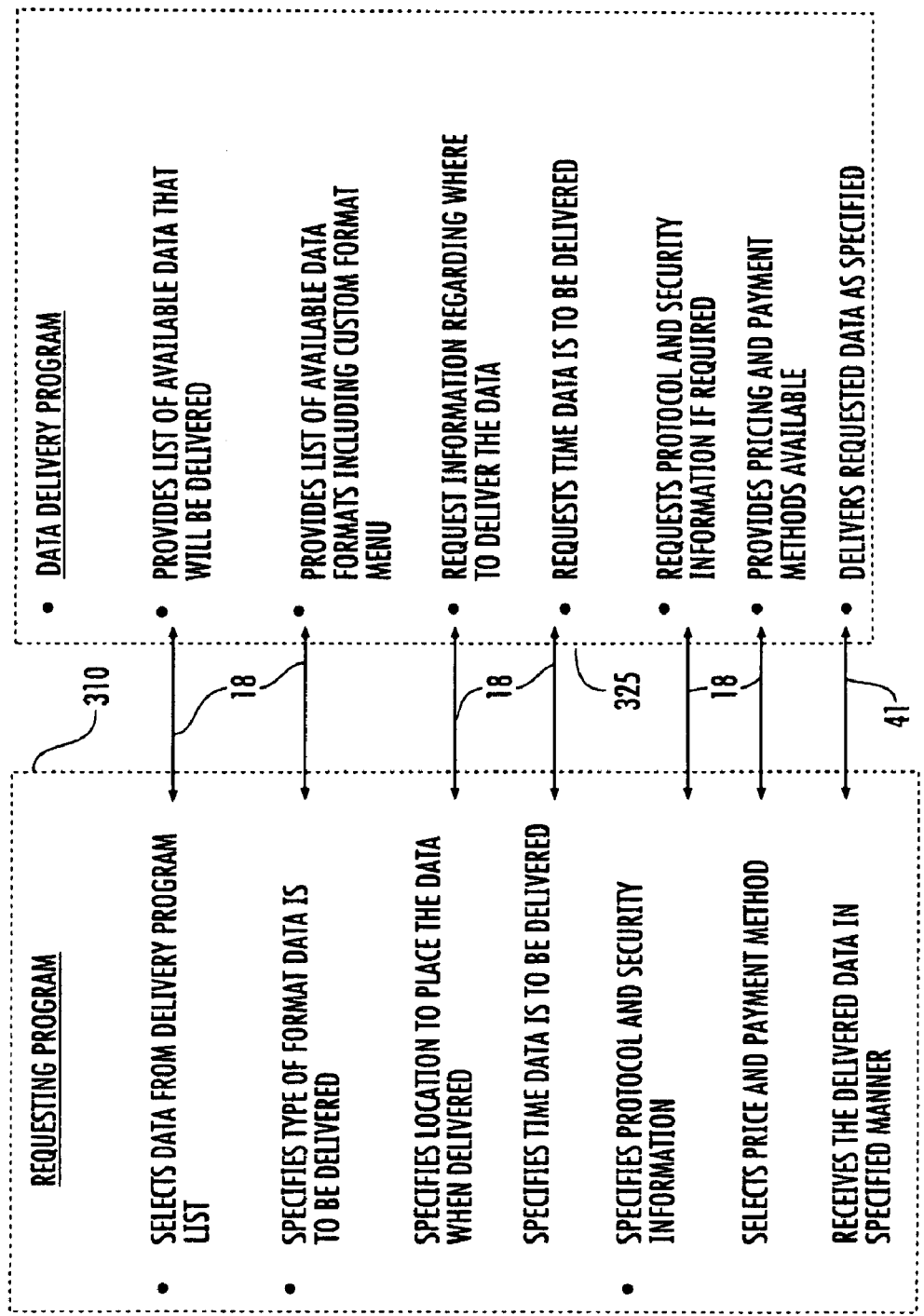
FIG. 5 is a logic flow diagram illustrating the information transmitted between the automated data delivery program associated with a website/network and a requesting program.

In FIG. 5 seven basic functions performed by the network ADD program 325 and the user computer application manager 315 of the users computer 15 are identified along with the signal paths 18 or 41 used to effect the functions therebetween. The computer programs or logic that perform these functions are described in more detail in connection with FIG. 7.

The program functions for the network ADD program 325 of the website/network 40 can be implemented starting with a menu of available data to be delivered. The menu can be written by persons skilled in the art of object programming in a language such as C++ or using Visual Basic and passing the menu to the user computer application manager 315 as discussed in connection with FIG. 7.

The initial step in the network ADD program 325 shown in FIG. 5 after the user computer application manager 315 connects to the network ADD program 325 via the signal path 18 is to provide the menu of available data located in the database associated with the legacy portion 320 to the user computer application manager 315 via the signal path 18. Data representing the menu of available data is then passed to the user computer terminal interface manager 305 which in turn passes the list to the master user computer terminal 10 via the signal path 12. In response thereto, the master user computer terminal 10 outputs the menu of available data in a format perceivable by the user.

When the user selects the desired data from the list using the master user computer terminal 10 the user's selection of data to be delivered is sent back to the network ADD program 325 in the reverse steps used to send the data selection menu to the user. In addition the user computer applications manager 315 sends the selected information to the user computer master database manager 310 so that the user computer master database manager 310 is prepared to accept the selected data to be delivered.

Upon receiving and recording the user's selection of data to be delivered from the website/network 40, the network ADD program 325 then automatically steps to a selection list of available predetermined specifications for delivering the data automatically. More specifically, the network ADD program 325 provides a list of available data formats that the network ADD program 325 can deliver the selected data to the user computer applications manager 315 via the signal path 18.

The data formats are then passed to the user computer terminal interface manager 305, which in turn passes the list to the master user computer terminal 10 via the signal path 12. The master user computer terminal 10 receives the list and outputs the list in a format perceivable by the user. When the user selects the desired data format from the list using the master user computer terminal 10 the data format selection is sent back to the network ADD program 325 in the reverse steps used to send the data format selection list to the user. In addition, the user computer application manager 315 sends the selected information to the user computer master database manager 310 to cause the user computer master database manager 310 to prepare to accept the selected data to be delivered in the selected data format.

Upon receiving and recording the selected data format selection, the network ADD program 325 then automatically steps to the next function in the selection list of available predetermined functions for delivering data automatically to request the user computer database location that the network ADD program 325 can deliver the selected data to the user computer master database manager 310 via the signal paths 41 and 41*a* or 41 and 42. The request for the location address of the user computer database is received by the user computer applications manager and then passed to the user computer terminal interface manager 305, which in turn passes the request to the master user computer terminal 10 via the signal path 12. In response thereto, the master user computer terminal 10 outputs the request in a format perceivable by the user, such as audio and/or video.

When the user specifies the desired user computer database location using the master user computer terminal 10, the location information is sent back to the network ADD program 325 in the reverse steps used to send the request for location information to the user. In addition the user computer application manager 315 sends the selected information to the user computer master database manager 310 so that the user computer master database manager 310 is prepared to accept the selected data in the user computer database location to be delivered.

Upon receiving and recording the user computer database location to deliver the data, the network ADD program 325 then automatically steps to the next function in the selection list of available predetermined functions for delivering data automatically to request the delivery schedule, i.e., the time or time periods that the network ADD program 325 should deliver the selected data to the user computer master database manager 3-10 via the signal paths 41 and 41*a* or 41 and 42. The request for the delivery schedule is received by the user computer applications manager 315 and then passed to the user computer terminal interface manager 305 which in turn passes the request to the master user computer terminal 10 via the signal path 12. In response thereto, the master user computer terminal 10 outputs the request in a format perceivable by the user, such as audio and/or video.

When the user specifies the desired delivery schedule using the master user computer terminal 10 the delivery schedule information is sent back to the network ADD program 325 in the reverse steps used to send the request for delivery time information to the user. In addition, the user computer application manager 315 sends the delivery schedule information to the user computer master database manager 310 so that the user computer master database manager 310 is prepared to accept the selected data at the correct time or time periods the data is to be delivered Upon receiving and recording the delivery schedule, the network ADD program 325 then automatically steps to the next function in the selection list of available predetermined functions for delivering data automatically. A request for the communication protocol (i.e., the communication protocol that the network ADD program 325 should use when communicating with the user computer master database manager 310 via the signal paths 41 and 41*a* or 41 and 42) is transmitted to the user computer application manager 315 via the signal path 18. The protocol information request is sent to the user computer terminal interface manager 305, which in turn passes the request to the master user computer terminal 10 via the signal path 12. In response thereto, the master user computer terminal 10 outputs the request in a format perceivable by the user.

When the user specifies the desired protocol using the master user computer terminal 10, the desired protocol information is sent back to the network ADD program 325 in the reverse steps used to send the request for delivery time information to the user. In addition the user computer applications manager 315 sends the desired protocol information to the user computer master database manager 310 so that the user computer master database manager 310 is prepared to accept the selected data to be delivered.

Upon receiving and recording the desired protocol for delivering the data, the network ADD program 325 then automatically steps to the next function and the network ADD program 325 presents to the user computer application manager 315 the available pricing and payment methods that the user operating the user computer 15 can select or input. The pricing and payment information is sent to the user computer terminal interface manager 305 which in turn passes the pricing and payment information to the master user computer terminal 10 via the signal path 12. In response thereto, the master user computer terminal 10 outputs the pricing and payment information in a format perceivable by the user.

When the user selects and/or inputs the desired payment method, such as a credit card number, using the master user computer terminal 10, the price and payment information is sent back to the network ADD program 325 in the reverse steps used to send the request for pricing and payment information to the user. In addition the user computer application manager 315 sends the payment information to the user computer master database manager 310 so that the user computer master database manager 310 can maintain a log of the cost for delivered data if desired by the user.

Upon receiving the pricing and payment information via signal path 18 the network ADD program 325 then automatically prepares to step to the run time function and the network ADD program 325 prepares to deliver the requested data via signal paths 41 and 41*a* or 41 and 42 as specified if no more data requests are made by the user computer application manager 315. The network ADD program 325 then outputs automatically the data identified by the user's selection to the users computer 15 based on the at least one set of predetermined data delivery specifications. If desired, the user's selection of the delivery schedule can indicate that the user wishes to have the data delivered automatically to the users computer 15 at a starting time, and at a predetermined time period thereafter. For example, the user's selection could indicate that the data is to be delivered the following day at 6:00 a.m., and then updated thereafter at five-minute intervals.

Figure 6:
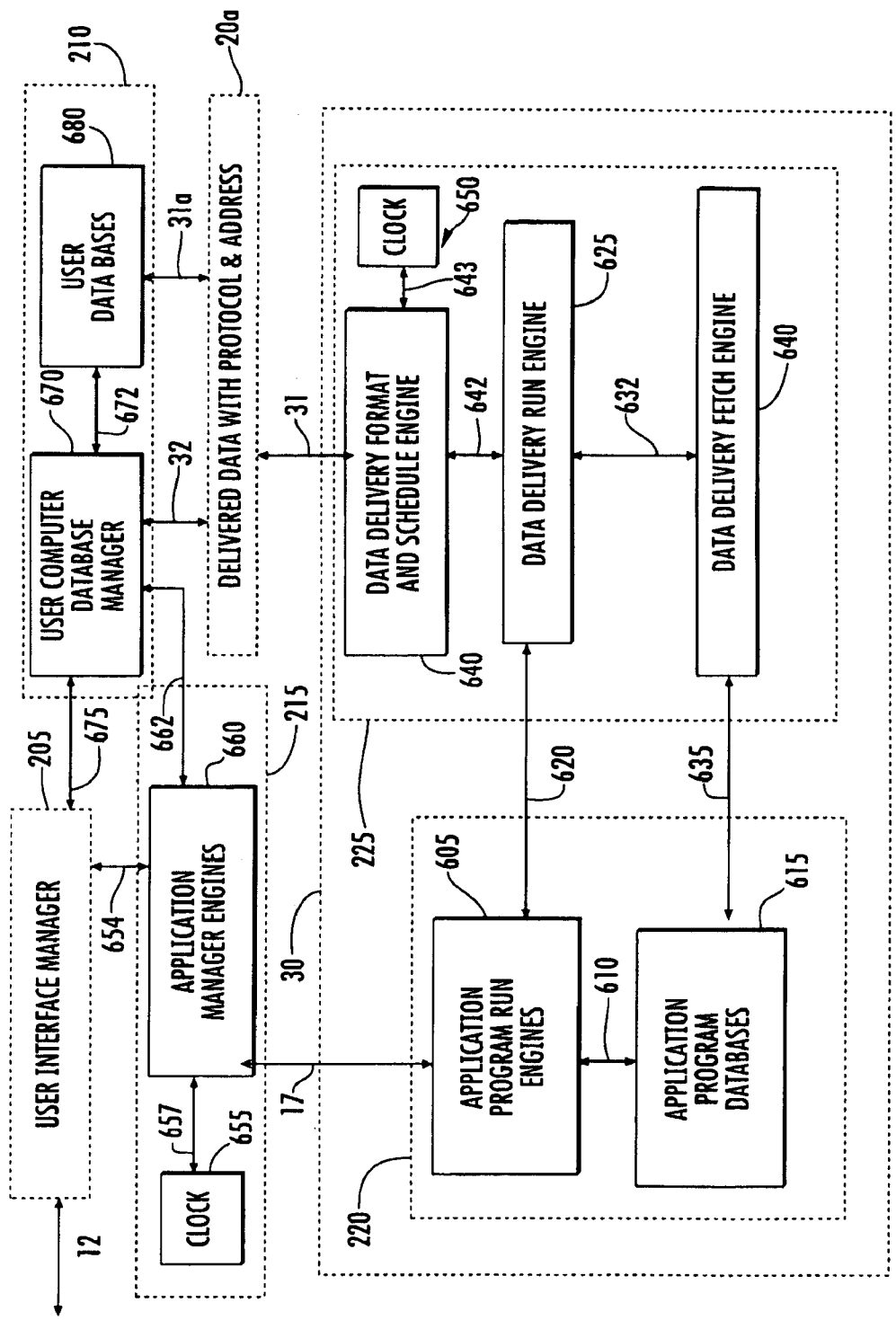
FIG. 6 is a block diagram of the automated data delivery program associated with the application program.

To be more specific about the additional engines required to offer data delivery service from the application program 30, FIG. 6 shows a more detailed block diagram of the application program 30 that has incorporated the ADD program 225. The legacy portion 220 of the application program 30 is further described in terms of the two main portions of any legacy application program design. The two main portions are the legacy application program run engines 605 associated with the legacy application program databases 615 via a signal path 610.

The legacy application program run engines 605 include all of the existing legacy application program functions required by the user except for the data delivery service that is located in the ADD program 225. An example of the legacy portion 220 would be the application program Excel 2000 manufactured and sold by Microsoft, Inc. Excel 2000 is provided with the legacy run engines and the legacy application program databases currently incorporated. If the automated data delivery module 225 such as described below in connection with FIG. 6 was added to the Excel 2000 program then a new application program 30, say Excel 2000ADD would allow data to be delivered repeatedly and automatically to the user computer 15 via the signal paths 31 and 31*a*, and/or 31 and 32.

It should be pointed out that the computer program on the users computer 15 requesting data delivery service do not now have features which allow such computer programs to handle many of the automated data delivery features described in connection with the application program 30 of FIG. 6. Consequently the details of the users computer 15 request modules, i.e. the user computer terminal interface manager 205, the user computer master database manager 210 and the user computer applications manager 215 are also described in connection with FIG. 6 in order to show an example of the logic inside both the user computer 15 and the application program 30 that has the ADD program 225. Also since the ability for programs on the users computer 15 to request data to be delivered automatically would only exist if programs like the application program 30 had the ability to automatically deliver data, the invention for requesting data to be delivered was not forseen when U.S. Ser. No. 60/186,874 was filed. Consequently, the specialized requirements needed by the users computer 15 to handle requests made to an automated data delivery service module, such as the application program 30 or the website/network 40 are described in connection with the request modules, i.e. the user computer terminal interface manager 205, the user computer master database manager 210, and the user computer applications manager 215 of FIG. 6.

There are two cases of data delivery requiring different degrees of involvement by the user computer 15. The simplest case is where no predetermined features for examining or synchronizing data, such as protocol, error or virus checking is required by the user computer 15. This case is described first in connection with data being delivered via signal path 31 and 31a and focuses on the working of the application program 30 because the user computer 15 receives the data automatically into a data base 680 identified by the user computer database location. In the simplest case, the data is delivered in a specific format and at specific times from the application program 30 to the database 680, which is not otherwise associated with the application program 30.

To initiate the automated data delivery system 5, a request is first made via the signal path 12 to the user computer terminal interface manager 205 of the user computer 15. The user computer terminal interface manager 205 could be a desktop Icon manager. The request could be a request to run the application program 30. The request is output by the user computer terminal interface manager 205 to an application manager engines 660 via a signal path 654. The application manager engines 660 can be an operating system, such as Windows 2000 manufactured and sold by Microsoft, Inc., or an application program. That is, if the user wanted to setup the data delivery service directly from the application program 30, then the application manager engines 660 would typically be the operating system running on the user computer 15 and used to run the application program 30. Alternatively, the data delivery service can be setup from another application program, which would or would not receive the delivered data. In this case, the application manager engines would be the other application program. In either case, the application manager engines 660 receives the request, and in response thereto, outputs the request to the application program run engines 605 via the signal path 17.

If for example the application program 30 resides on a storage device on the users computer 15, the request would be transmitted directly to the application program 30 via the signal path 17. However if the application program 30 was on some remotely located computer then the user computer terminal interface manager 205 would first have to use the application manager engines 660 to establish a connection to the computer on which the application program 30 resides.

In either case the signal path 17 causes the application program run engines 605 to operate and thereby causes the request to be transmitted to a data delivery engine 625 of the ADD program 225 via a signal path 620. The menu of available data is then provided to the master user computer terminal 10 as discussed previously with reference to FIG. 4.

The menu of available data presented by the data delivery run engine 625 to the user will show the data available for delivery which is located in the application program databases 615. It should be noted that the application program databases 615 can be updated by the application program run engines 605 after the application program run engines 605 finish the application program run engines 605 run time tasks.

Once the user selects the data delivery information as described previously in connection with FIG. 4, the data delivery information is transmitted to the data delivery run engine 625 which transmits the data delivery information to a format, location, protocol and schedule engines 640 (which is hereinafter referred to as the "DDFLPS 640") via a signal path 642. The DDFLPS 640 receives data delivery information including the selected format, user computer database location, protocol and schedule data from the data delivery run engine 625 via the signal path 642 and the data delivery fetch engine 630 receives the user's selection of data from the data delivery run engine 625 via a signal path 632.

Once the data delivery information has been selected from the menu of available data and the selection list of available predetermined specifications for delivering data provided by the data delivery run engine 625 to the master user computer terminal 10, and has been received by the data delivery run engine 625, the data delivery run engine 625 activates and controls the DDFLPS 640 and the data delivery fetch engine 630 to cause the data identified by the user's selection to be automatically output to the users computer 15 based on at least one set of data delivery specifications stored in the DDFLPS 640.

For example, the application program 30 can be a program that maintains the stock market values for the New York Stock Exchange in the database 615 such a SQL server 7 database. A user operating the user computer 15 selects from the menu supplied by the data delivery run engine 625 that the user wants the current value for IBM stock delivered to the users Excel 2000 database 680 located on the storage unit, such as a hard disk, in the users computer 15 every two seconds. The format (e.g., Excel 2000), user computer database location (e.g., C:\excel2000\ . . . ), protocol and delivery frequency (e.g. every two seconds) information are transmitted to the DDFLPS 640 by the data delivery run engine 625 via the signal path 642.

Then, every time a computer clock 650 associated with the DDFLPS 640 via the signal path 643 denotes that it is time (i.e., two seconds have passed since the last delivery of data) to deliver the stock price to the user database 680, a signal would be sent to the data delivery fetch engine 630 via the signal paths 642 and 632 to obtain the IBM stock price from the data base 615 via the signal path 635. The IBM stock price is then provided to the DDFLPS 640 via the signal paths 632 and 642 so that the proper format for delivery to the user data base 680 is accomplished by the DDFLPS 640. The DDFLPS 640 then outputs the IBM stock price to the users data base 680 (which in this example is Excel 2000). The DDFLPS 640 could be as simple as connecting to the application database 680 of the user computer 15 residing on the same computer platform as the application program 30 to as complicated as connecting remotely through a dial up network using a communication program such as PC anywhere using predetermined passwords to connect to the remotely located user computer 15 running on the separate platform and then to the user data base 680.

The DDFLPS 640 also handles all the encrypting required in the communication between the DDFLPS 640 and the user data base 680.

The simplest cases of automated data delivery just described only requires the application program 30 to operate after the data request was made by the user. Note that in the simplest but very important case of automated data delivery the user only has to connect to the application program 30 once to make the data delivery request and in fact the connection to the application program 30 to make the data deliver request does not have to be made from the user computer 15 where the users database 680 for delivery is to be made. This is an important feature of the present invention because many user computers 15 will have 20 to 50 application programs running on the same machine and might need data transferred between many of them automatically and routinely so that a Master Operating Software System (MOSS) program as described in U.S. Ser. No. 60/186,874 can keep the user computer terminals fully integrated without the users having to technically understand much about any of the application programs delivering data to each other.

The second and more complicated case of automated data delivery is where a user computer database manager 670 of the user computer 15 needs to automatically approve the incoming data going to the database 680 each time data is delivered from the application program 30 via the signal paths 31 and 32. This normally would be the case if data were delivered from the application program 30 that was not controlled by the user requesting data to be delivered.

At least one of the predetermined data delivery specifications is checked, automatically, by an automatic data reception and verification program each time data is delivered to the user computer database manager 670. One way to insure security would be that every time a data signal for the delivery of data to the user data bases 680 was received on the signal path 32, a valid password would be required before the incoming data on the signal path 32 would be deciphered. The valid password would have been established during the initial data delivery request and sent to the user computer database manager 670 via the signal path 662 from the application manager engines 660 before or after completing the request for data delivery as described in connection with FIG. 4.

When a valid password is established by the user computer database manager 670 each time data is delivered on signal path 32 from the application program 30, the data is deciphered according to the protocol established during the initial data request and then the data is placed in the proper user database 680 location by the user computer database manager 670. Although only one user data base 680 is shown in FIG. 6, it should be understood that any number, such as 3, 4, 5, 20 or 50 user databases 680 can be installed on the user computer 15. Also note that for added security in the second case the application manager engines 660 of the user computer 15 can keep a record of when data is to be delivered and from where and in what format so that security filters can keep unwanted viruses out of the users computer 15.

The operation of the application program 30 is similar in both case one and case two described above.

Figure 7:
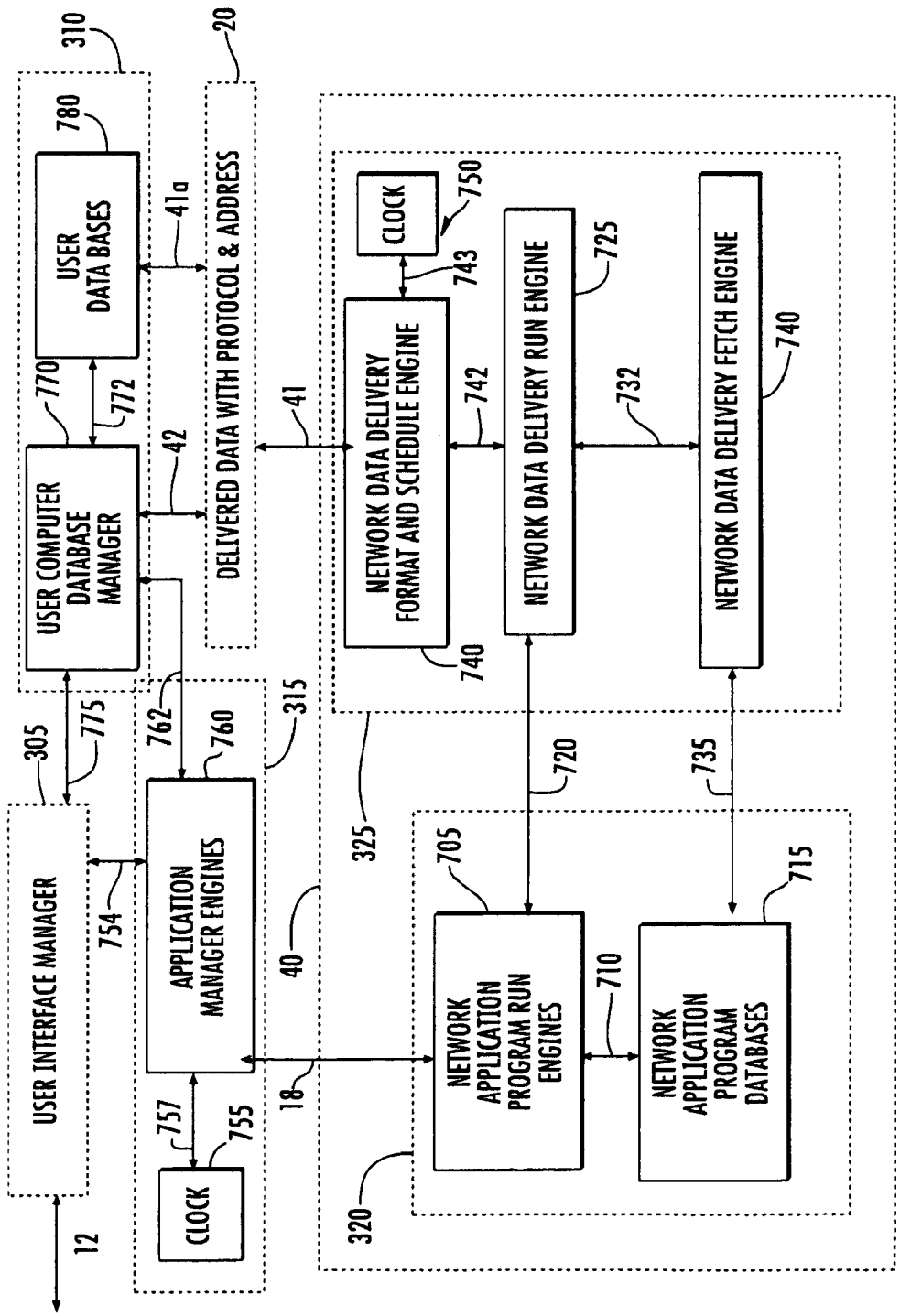
FIG. 7 is a block diagram of the automated data delivery program associated with the website/network.

To be more specific about the additional engines required to offer data delivery service from the network/website 40, FIG. 7 shows a more detailed block diagram of the network/website 40 that has incorporated the network ADD program 325. The legacy portion 320 of the network/website 40 is further described in terms of the two main portions of any legacy network application program design. The two main portions are a legacy network application program run engines 705 associated with a legacy network application program databases 715 via a signal path 710.

The legacy application program run engines 705 include all of the existing legacy network application program functions required by the user except for the data delivery service that is located in the network ADD program 325. An example of the legacy portion 320 would be the network application program Access 2000 (manufactured and sold by Microsoft, Inc.) running on a server. Access 2000 is provided with the legacy run engines and the legacy application program databases currently incorporated. If the network ADD program 325 such as described below in connection with FIG. 7 was added to the Access 2000 program then a new computer program for the network/website 40, say Excel 2000ADD would allow data to be delivered repeatedly and automatically to the user computer 15 via the signal path 41.

The details of the users computer 15 request modules, i.e. the user computer terminal interface manager 305, the user computer master database manager 310 and the user computer applications manager 315 are also described in connection with FIG. 7 in order to show an example of the logic inside both the user computer 15 and the network/website 40 that has the network ADD program 325. Also since the ability for programs on the users computer 15 to request data to be delivered automatically would only exist if programs like the network/website 40 had the ability to automatically deliver data, the invention for requesting data to be delivered was not forseen when U.S. Ser. No. 60/186,874 was filed. Consequently, the specialized requirements needed by the users computer 15 to handle requests made to an automated data delivery service module, such as the network/website 40 or the website/network 40 are described in connection with the request modules, i.e. the user computer terminal interface manager 305, the user computer master database manager 310, and the user computer applications manager 315 of FIG. 7.

There are two cases of data delivery requiring different degrees of involvement by the user computer 15. The simplest case is where no predetermined features for examining or synchronizing data, such as protocol, error or virus checking is required by the user computer 15. This case is described first in connection with data being delivered via signal path 41 and 41a and focuses on the working of the network/website 40 because the user computer 15 receives the data automatically into a data base 780 identified by the user computer database location. In the simplest case, the data is delivered in a specific format and at specific times from the network/website 40 to the database 780, which is not otherwise associated with the network/website 40.

To initiate the automated data delivery system 5, a request is first made via the signal path 12 to the user computer terminal interface manager 305 of the user computer 15. The user computer terminal interface manager 305 could be a desktop Icon manager. The request could be a request to establish a connection with the network/website 40. The request is output by the user computer terminal interface manager 305 to an application manager engines 760 via a signal path 754. The application manager engines 760 can be an operating system, such as Windows 2000 manufactured and sold by Microsoft, Inc., or an application program. That is, if network/website 40 is a remotely located network computer, then the application manager engines 760 would typically be the operating system running on the user computer 15 and used to establish a connection with the network/website 40. Alternatively, if the network/website 40 is a remotely located Internet website, the application manager engines 760 would typically be an application program, such as a browser.

In either case, the application manager engines 760 receives the request, and in response thereto, outputs the request to the network application program run engines 705 via the signal path 18.

In response thereto, the application program run engines 705 causes the request to be transmitted to a ADD network data delivery run and pricing engine 725 of the network ADD program 325 via a signal path 720. The menu of available data is then provided to the master user computer terminal 10 as discussed previously with reference to FIG. 4.

The menu of available data presented by the ADD network data delivery run and pricing engine 725 to the user will show the data available for delivery which is located in the application program databases 715. It should be noted that the application program databases 715 can be updated by the application program run engines 705 after the application program run engines 705 finish the application program run engines 705 run time tasks.

Once the user selects the data delivery information as described previously in connection with FIG. 4, the data delivery information is transmitted to the ADD network data delivery run and pricing engine 725 which transmits the data delivery information to a network data delivery format, location, protocol and schedule engines 740 (which is hereinafter referred to as the "NDDFLPS 740") via a signal path 742. The NDDFLPS 740 receives data delivery information including the selected format, user computer database location, protocol and schedule data from the ADD network data delivery run and pricing engine 725 via the signal path 742 and a network data delivery fetch engine 730 receives the user's selection of data from the ADD network data delivery run and pricing engine 725 via a signal path 732.

Once the data delivery information has been selected from the menu of available data and the selection list of available predetermined specifications for delivering data provided by the ADD network data delivery run and pricing engine 725 to the master user computer terminal 10, and has been received by the ADD network data delivery run and pricing engine 725, the ADD network data delivery run and pricing engine 725 activates and controls the NDDFLPS 740 and the network data delivery fetch engine 730 to cause the data identified by the user's selection to be automatically output to the users computer 15 based on at least one set of data delivery specifications stored in the NDDFLPS 740. In addition, the ADD network data delivery run and pricing engine 725 maintains the information to bill the user.

For example, the network/website 40 can be a network computer or website that maintains the stock market values for the New York Stock Exchange in the database 715, such a SQL server 7 database. A user operating the user computer 15 selects from the menu supplied by the ADD network data delivery run and pricing engine 725 that the user wants the current value for IBM stock delivered to the users Access 2000 database 780 located on the storage unit, such as a hard disk, in the users computer 15 every two seconds. The format (e.g., Excel 2000), user computer database location (e.g., C:\excel2000\ . . . ), protocol, and delivery schedule (e.g. every two seconds), and credit or payment information are transmitted to the NDDFLPS 740 by the ADD network data delivery run and pricing engine 725 via the signal path 742. The credit or payment information is maintained in the ADD network data delivery run and pricing engine 725.

Then, every time a computer clock 750 associated with the NDDFLPS 740 via the signal path 743 denotes that it is time (i.e., two seconds have passed since the last delivery of data) to deliver the stock price to the user database 780, a signal would be sent to the network data delivery fetch engine 730 via the signal paths 742 and 732 to obtain the IBM stock price from the data base 715 via the signal path 735. The IBM stock price is then provided to the NDDFLPS 740 via the signal paths 732 and 742 so that the proper format for delivery to the user data base 780 is accomplished by the NDDFLPS 740. The NDDFLPS 740 then outputs the IBM stock price to the users data base 780 (which in this example is Access 2000). The NDDFLPS 740 could be as simple as connecting to the application database 780 of the user computer 15 residing on the same computer platform as the network/website 40 to as complicated as connecting remotely through a dial up network using a communication program such as PC anywhere using predetermined passwords to connect to the remotely located user computer 15 running on the separate platform and then to the user data base 780.

The ADD network data delivery run and pricing engine 725 could charge a per click charge, a per delivery charge, or a a flat rate per month. Moreover, the pricing could vary depending on the nature of and/or the amount of the data delivered.

The NDDFLPS 740 also handles all the encrypting required in the communication between the NDDFLPS 740 and the user data base 780.

The simplest cases of automated data delivery just described only requires the network/website 40 to operate after the data request was made by the user. Note that in the simplest but very important case of automated data delivery the user only has to connect to the network/website 40 once to make the data delivery request and in fact the connection to the network/website 40 to make the data deliver request does not have to be made from the user computer 15 where the users database 780 for delivery is to be made.

The second and more complicated case of automated data delivery is where a user computer database manager 770 of the user computer 15 needs to automatically approve the incoming data going to the database 780 each time data is delivered from the network/website 40 via the signal paths 41 and 42. This normally would be the case if data were delivered from the network/website 40 that was not controlled by the user requesting data to be delivered.

At least one of the predetermined data delivery specifications is checked, automatically, by an automatic data reception and verification program each time data is delivered to the user computer database manager 770. One way to insure security would be that every time a data signal for the delivery of data to the user data bases 780 was received on the signal path 42, a valid password would be required before the incoming data on the signal path 42 would be deciphered. The valid password would have been established during the initial data delivery request and sent to the user computer database manager 770 via the signal path 762 from the application manager engines 760 before or after completing the request for data delivery as described in connection with FIG. 4.

When a valid password is established by the user computer database manager 770 each time data is delivered on signal path 32 from the network/website 40, the data is deciphered according to the protocol established during the initial data request and then the data is placed in the proper user database 780 location by the user computer database manager 770. Although only one user data base 780 is shown in FIG. 7, it should be understood that any number, such as 3, 4, 5, 20 or 50 user databases 780 can be installed on the user computer 15. Also note that for added security in the second case the application manager engines 760 of the user computer 15 can keep a record of when data is to be delivered and from where and in what format so that security filters can keep unwanted viruses out of the users computer 15.

The operation of the network/website 40 is similar in both case one and case two described above.

From the above description, it is clear that the present invention is well adapted to attain the advantages mentioned herein as well as those inherent in the invention. While presently preferred embodiments of the invention have been described for purposes of this disclosure, it will be readily understood that numerous changes may be made which will readily suggest themselves to those skilled in the art and which are accomplished within the spirit of the invention disclosed.

What is claimed is:

1. A method for repeatedly delivering data to a users computer having at least two databases with each database having a user computer database location, the method comprising the steps of: (a) providing a menu of available data to be delivered from an automated data delivery system that includes a selection list of available predetermined specifications for delivering data automatically wherein at least one of the predetermined specifications for delivering data allows the user to specify at least one of the user computer database locations for the data to be delivered; (b) receiving a user's selection of data to be delivered from the automated data delivery system to the users computer based on the menu of available data; (c) receiving a user's selection of at least one set of predetermined data delivery specifications; and time for the data to be delivered; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting automatically and repeatedly, the data identified by the user's selection in the data format included in the predetermined data delivery specifications.

2. The method of claim 1, further comprising the steps of: receiving, by the user's computer, the data identified by the user's selection; and 3 checking, automatically, at least one of the predetermined data delivery specifications with an automatic data reception and verification program each time data is delivered.

3. The method of claim 2, wherein the automated data delivery system is remote from the users computer.

4. The method of claim 3, wherein in the step of checking, automatically, at least one of the predetermined data delivery specifications with the automatic data reception and verification program, the automatic data reception and verification program is incorporated into a browser program.

5. The method of claim 4, wherein at least one of the predetermined data delivery specifications checked by the automatic data reception and verification program is a password.

6. The method of claim 2, wherein in the step of checking, automatically, at least one of the predetermined data delivery specifications with the automatic data reception and verification program, the automatic data reception and verification program is incorporated into an application program.

7. The method of claim 1, further comprising the steps of: receiving, by the user's computer, the data identified by the user's selection; and checking, automatically, at least one of the predetermined data delivery specifications with an automatic data reception and verification program each time data is delivered.

8. The method of claim 1, wherein step (d) is defined further as outputting, automatically and repeatedly, the data identified by the user's selection to a data base location on the users computer and identified by the at least one set of predetermined data delivery specifications.

9. The method of claim 8, further comprising the steps of: receiving, by the user's computer, the data identified by the user's selection; and checking, automatically, at least one of the predetermined data delivery specifications with an automatic data reception and verification program each time data is delivered.

10. The method of claim 1, wherein step (d) is defined further as outputting, automatically and repeatedly, the data identified by the user's selection at specified times selected by the user and identified by the at least one set of predetermined data delivery specifications.

11. The method of claim 10, further comprising the steps of: receiving, by the user's computer, the data identified by the user's selection; and checking, automatically, at least one of the predetermined data delivery specifications with an automatic data reception and verification program each time data is delivered.

12. The method of claim 1, wherein step (d) is defined further as outputting, automatically and repeatedly, the data identified by the user's selection via a communication protocol specified by the user and identified by the at least one set of predetermined data delivery specifications.

13. The method of claim 12, further comprising the steps of: receiving, by the user's computer, the data identified by the user's selection; and checking, automatically, at least one of the predetermined data delivery specifications with an automatic data reception and verification program each time data is delivered.

14. The method of claim 1, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

15. The method of claim 14, further comprising the steps of: receiving, by the user's computer, the data identified by the user's selection; and checking, automatically, at least one of the predetermined data delivery specifications with an automatic data reception and verification program each time data is delivered.

16. The method of claim 14, wherein step (d) is defined further as outputting, automatically and repeatedly, the data identified by the user's selection to a data base location on the users computer and identified by the at least one set of predetermined data delivery specifications.

17. The method of claim 16, further comprising the steps of: receiving, by the user's computer, the data identified by the user's selection; and checking, automatically, at least one of the predetermined data delivery specifications with an automatic data reception and verification program each time data is delivered.

18. The method of claim 16, wherein step (d) is defined further as outputting, automatically and repeatedly, the data identified by the user's selection at specified times selected by the user and identified by the at least one set of predetermined data delivery specifications.

19. The method of claim 18, further comprising the steps of: receiving, by the user's computer, the data identified by the user's selection; and checking, automatically, at least one of the predetermined data delivery specifications with an automatic data reception and verification program each time data is delivered.

20. The method of claim 18, wherein step (d) is defined further as outputting, automatically and repeatedly, the data identified by the user's selection via a communication protocol specified by the user and identified by the at least one set of predetermined data delivery specifications.

21. The method of claim 20, further comprising the steps of: receiving, by the user's computer, the data identified by the user's selection; and checking, automatically, at least one of the predetermined data delivery specifications with an automatic data reception and verification program each time data is delivered.

22. A method for repeatedly delivering data to a users computer having at least two databases with each database having a user computer database location from a website established on the Internet, the method comprising the steps of: (a) providing, by the website, a menu of available data to be delivered from an automated data delivery system that includes a selection list of available predetermined specifications for delivering data automatically wherein at least one of the predetermined specifications for delivering data allows the user to specify at least one of the user computer database locations for the data to be delivered; (b) receiving, by the website, a user's selection of data to be delivered from the automated data delivery system to the users computer based on the menu of available data; (c) receiving, by the website, a user's selection of at least one set of predetermined data delivery specifications including at least one of the user computer database locations for the data to be delivered and terms of payment for the delivery of data; and time for the data to be delivered; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly the data identified by the user's selection in the data format included in the predetermined data delivery specifications.

23. The method of claim 22, further comprising the steps of: receiving, by the user's computer, the data identified by the user's selection; and checking, automatically, at least one of the predetermined data delivery specifications with an automatic data reception and verification program each time data is delivered.

24. The method of claim 23, wherein the automated data delivery system is remote from the user computer.

25. The method of claim 24, wherein in the step of checking, automatically, at least one of the predetermined data delivery specifications with the automatic data reception and verification program, the automatic data reception and verification program is incorporated into a browser program.

26. The method of claim 25, wherein at least one of the predetermined data delivery specifications checked by the automatic data reception and verification program is a password.

27. The method of claim 23, wherein in the step of checking, automatically, at least one of the predetermined data delivery specifications with the automatic data reception and verification program, the automatic data reception and verification program is incorporated into an application program.

28. The method of claim 22, further comprising the steps of: receiving, by the user's computer, the data identified by the user's selection; and checking, automatically, at least one of the predetermined data delivery specifications with an automatic data reception and verification program each time data is delivered.

29. The method of claim 22, wherein step (d) is defined further as outputting, automatically and repeatedly, the data identified by the user's selection to a data base location on the users computer and identified by the at least one set of predetermined data delivery specifications.

30. The method of claim 29, further comprising the steps of: receiving, by the user's computer, the data identified by the user's selection; and checking, automatically, at least one of the predetermined data delivery specifications with an automatic data reception and verification program each time data is delivered.

31. The method of claim 22, wherein step (d) is defined further as outputting, automatically and repeatedly, the data identified by the user's selection at specified times selected by the user and identified by the at least one set of predetermined data delivery specifications.

32. The method of claim 31, further comprising the steps of: receiving, by the user's computer, the data identified by the user's selection; and checking, automatically, at least one of the predetermined data delivery specifications with an automatic data reception and verification program each time data is delivered.

33. The method of claim 31, further comprising the steps of: receiving, by the user's computer, the data identified by the user's selection; and checking, automatically, at least one of the predetermined data delivery specifications with an automatic data reception and verification program each time data is delivered.

34. The method of claim 31, wherein step (d) is defined further as outputting, automatically and repeatedly, the data identified by the user's selection to a data base location on the users computer and identified by the at least one set of predetermined data delivery specifications.

35. The method of claim 34, further comprising the steps of: receiving, by the user's computer, the data identified by the user's selection; and checking, automatically, at least one of the predetermined data delivery specifications with an automatic data reception and verification program each time data is delivered.

36. The method of claim 34, wherein step (d) is defined further as outputting, automatically and repeatedly, the data identified by the user's selection at specified times selected by the user and identified by the at least one set of predetermined data delivery specifications.

37. The method of claim 36, further comprising the steps of: receiving, by the user's computer, the data identified by the user's selection; and checking, automatically, at least one of the predetermined data delivery specifications with an automatic data reception and verification program each time data is delivered.

38. The method of claim 36, wherein step (d) is defined further as outputting, automatically and repeatedly, the data identified by the user's selection via a communication protocol specified by the user and identified by the at least one set of predetermined data delivery specifications.

39. The method of claim 38, further comprising the steps of: receiving, by the user's computer, the data identified by the user's selection; and checking, automatically, at least one of the predetermined data delivery specifications with an automatic data reception and verification program each time data is delivered.

40. The method of claim 22, wherein step (d) is defined further as outputting, automatically and repeatedly, the data identified by the user's selection via a communication protocol specified by the user and identified by the at least one set of predetermined data delivery specifications.

41. The method of claim 40, further comprising the steps of: receiving, by the user's computer, the data identified by the user's selection; and checking, automatically, at least one of the predetermined data delivery specifications with an automatic data reception and verification program each time data is delivered.

42. The method of claim 22, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

43. A method for repeatedly delivering data to a users computer having at least two databases with each database having a user computer database location, the method comprising the steps of: (a) providing, electronically, a menu of available data to be delivered from an automated data delivery system that includes a selection list of available predetermined specifications for delivering data automatically wherein at least one of the predetermined specifications for delivering data allows the user to specify at least one of the user computer database locations for the data to be delivered; (b) receiving, electronically, a user's selection of data to be delivered from the automated data delivery system to the users computer based on the menu of available data; (c) receiving, electronically, a user's selection of at least one set of predetermined data delivery specifications; and time for the data to be delivered; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting automatically and repeatedly, the data identified by the user's selection in the data format included in the predetermined data delivery specifications.

44. The method of claim 43, further comprising the steps of: receiving, by the user's computer, the data identified by the user's selection; and checking, automatically, at least one of the predetermined data delivery specifications with an automatic data reception and verification program each time data is delivered.

45. The method of claim 44, wherein the automated data delivery system is remote from the users computer.

46. The method of claim 45, wherein in the step of checking, automatically, at least one of the predetermined data delivery specifications with the automatic data reception and verification program, the automatic data reception and verification program is incorporated into a browser program.

47. The method of claim 46, wherein at least one of the predetermined data delivery specifications checked by the automatic data reception and verification program is a password.

48. The method of claim 44, wherein in the step of checking, automatically, at least one of the predetermined data delivery specifications with the automatic data reception and verification program, the automatic data reception and verification program is incorporated into an application program.

49. The method of claim 43, further comprising the steps of receiving, by the user's computer, the data identified by the user's selection; and checking, automatically, at least one of the predetermined data delivery specifications with an automatic data reception and verification program each time data is delivered.

50. The method of claim 43, wherein step (d) is defined further as outputting, automatically and repeatedly, the data identified by the user's selection to a data base location on the users computer and identified by the at least one set of predetermined data delivery specifications.

51. The method of claim 50, further comprising the steps of: receiving, by the user's computer, the data identified by the user's selection; and checking, automatically, at least one of the predetermined data delivery specifications with an automatic data reception and verification program each time data is delivered.

52. The method of claim 43, wherein step (d) is defined further as outputting, automatically and repeatedly, the data identified by the user's selection at specified times selected by the user and identified by the at least one set of predetermined data delivery specifications.

53. The method of claim 52, further comprising the steps of: receiving, by the user's computer, the data identified by the user's selection; and checking, automatically, at least one of the predetermined data delivery specifications with an automatic data reception and verification program each time data is delivered.

54. The method of claim 43, wherein step (d) is defined further as outputting, automatically and repeatedly, the data identified by the user's selection via a communication protocol specified by the user and identified by the at least one set of predetermined data delivery specifications.

55. The method of claim 54, further comprising the steps of: receiving, by the user's computer, the data identified by the user's selection; and checking, automatically, at least one of the predetermined data delivery specifications with an automatic data reception and verification program each time data is delivered.

56. The method of claim 43, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

57. The method of claim 56, further comprising the steps of: receiving, by the user's computer, the data identified by the user's selection; and checking, automatically, at least one of the predetermined data delivery specifications with an automatic data reception and verification program each time data is delivered.

58. The method of claim 56, wherein step (d) is defined further as outputting, automatically and repeatedly, the data identified by the user's selection to a data base location on the users computer and identified by the at least one set of predetermined data delivery specifications.

59. The method of claim 58, further comprising the steps of: receiving, by the user's computer, the data identified by the user's selection; and checking, automatically, at least one of the predetermined data delivery specifications with an automatic data reception and verification program each time data is delivered.

60. The method of claim 58, wherein step (d) is defined further as outputting, automatically and repeatedly, the data identified by the user's selection at specified times selected by the user and identified by the at least one set of predetermined data delivery specifications.

61. The method of claim 60, further comprising the steps of: receiving, by the user's computer, the data identified by the user's selection; and checking, automatically, at least one of the predetermined data delivery specifications with an automatic data reception and verification program each time data is delivered.

62. The method of claim 60, wherein step (d) is defined further as outputting, automatically and repeatedly, the data identified by the user's selection via a communication protocol specified by the user and identified by the at least one set of predetermined data delivery specifications.

63. The method of claim 62, further comprising the steps of: receiving, by the user's computer, the data identified by the user's selection; and checking, automatically, at least one of the predetermined data delivery specifications with an automatic data reception and verification program each time data is delivered.

64. A method for repeatedly delivering data to a users computer having at least two databases with each database having a user computer database location from a website established on the Internet, the method comprising the steps of: (a) providing, electronically by the website, a menu of available data to be delivered from an automated data delivery system that includes a selection list of available predetermined specifications for delivering data automatically wherein at least one of the predetermined specifications for delivering data allows the user to specify at least one of the user computer database locations for the data to be delivered; (b) receiving, electronically by the website, a user's selection of data to be delivered from the automated data delivery system to the users computer based on the menu of available data; (c) receiving, electronically by the website, a user's selection of at least one set of predetermined data delivery specifications including terms of payment for the delivery of data; and time for the data to be delivered; (d) outputting, electronically, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

65. The method of claim 64, further comprising the steps of: receiving, by the user's computer, the data identified by the user's selection; and checking, automatically, at least one of the predetermined data delivery specifications with an automatic data reception and verification program each time data is delivered.

66. The method of claim 65, wherein the automated data delivery system is remote from the users computer.

67. The method of claim 66, wherein in the step of checking, automatically, at least one of the predetermined data delivery specifications with the automatic data reception and verification program, the automatic data reception and verification program is incorporated into a browser program.

68. The method of claim 67, wherein at least one of the predetermined data delivery specifications checked by the automatic data reception and verification program is a password.

69. The method of claim 65, wherein in the step of checking, automatically, at least one of the predetermined data delivery specifications with the automatic data reception and verification program, the automatic data reception and verification program is incorporated into an application program.

70. The method of claim 64, further comprising the steps of: receiving, by the user's computer, the data identified by the user's selection; and checking, automatically, at least one of the predetermined data delivery specifications with an automatic data reception and verification program each time data is delivered.

71. The method of claim 64, wherein step (d) is defined further as outputting, automatically and repeatedly, the data identified by the user's selection to a data base location on the users computer and identified by the at least one set of predetermined data delivery specifications.

72. The method of claim 71, further comprising the steps of: receiving, by the user's computer, the data identified by the user's selection; and checking, automatically, at least one of the predetermined data delivery specifications with an automatic data reception and verification program each time data is delivered.

73. The method of claim 64, wherein step (d) is defined further as outputting, automatically and repeatedly, the data identified by the user's selection at specified times selected by the user and identified by the at least one set of predetermined data delivery specifications.

74. The method of claim 73, further comprising the steps of: receiving, by the user's computer, the data identified by the user's selection; and checking, automatically, at least one of the predetermined data delivery specifications with an automatic data reception and verification program each time data is delivered.

75. The method of claim 73, further comprising the steps off receiving, by the user's computer, the data identified by the user's selection; and checking, automatically, at least one of the predetermined data delivery specifications with an automatic data reception and verification program each time data is delivered.

76. The method of claim 73, wherein step (d) is defined further as outputting, automatically and repeatedly, the data identified by the user's selection to a data base location on the users computer and identified by the at least one set of predetermined data delivery specifications.

77. The method of claim 76, wherein step (d) is defined further as outputting, automatically and repeatedly, the data identified by the user's selection at specified times selected by the user and identified by the at least one set of predetermined data delivery specifications.

78. The method of claim 77, further comprising the steps of: receiving, by the user's computer, the data identified by the user's selection; and checking, automatically, at least one of the predetermined data delivery specifications with an automatic data reception and verification program each time data is delivered.

79. The method of claim 77, wherein step (d) is defined further as outputting, automatically and repeatedly, the data identified by the user's selection via a communication protocol specified by the user and identified by the at least one set of predetermined data delivery specifications.

80. The method of claim 79, further comprising the steps of: receiving, by the user's computer, the data identified by the user's selection; and checking, automatically, at least one of the predetermined data delivery specifications with an automatic data reception and verification program each time data is delivered.

81. The method of claim 76, further comprising the steps of: receiving, by the user's computer, the data identified by the user's selection; and checking, automatically, at least one of the predetermined data delivery specifications with an automatic data reception and verification program each time data is delivered.

82. The method of claim 64, wherein step (d) is defined further as outputting, automatically and repeatedly, the data identified by the user's selection via a communication protocol specified by the user and identified by the at least one set of predetermined data delivery specifications.

83. The method of claim 82, further comprising the steps of: receiving, by the user's computer, the data identified by the user's selection; and checking, automatically, at least one of the predetermined data delivery specifications with an automatic data reception and verification program each time data is delivered.

84. The method of claim 64, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

85. A method for repeatedly delivering data to a users computer having at least two databases with each database having a user computer database location, the method comprising the steps of: (a) providing a menu of available data to be delivered from an automated data delivery system that includes a selection list of available predetermined specifications for delivering data automatically wherein at least one of the predetermined specifications for delivering data allows the user to specify the format for the data to be delivered and at least one of the user computer database locations for the data to be delivered; (b) receiving a user's selection of data to be delivered from the automated data delivery system to the users computer based on the menu of available data; (c) receiving a user's selection of at least one set of predetermined data delivery specifications; and time for the data to be delivered; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

86. The method of claim 85, further comprising the steps of: receiving, by the user's computer, the data identified by the user's selection; and checking, automatically, at least one of the predetermined data delivery specifications with an automatic data reception and verification program each time data is delivered.

87. The method of claim 86, wherein the automated data delivery system is remote from the users computer.

88. The method of claim 87, wherein in the step of checking, automatically, at least one of the predetermined data delivery specifications with the automatic data reception and verification program, the automatic data reception and verification program is incorporated into a browser program.

89. The method of claim 88, wherein at least one of the predetermined data delivery specifications checked by the automatic data reception and verification program is a password.

90. The method of claim 86, wherein in the step of checking, automatically, at least one of the predetermined data delivery specifications with the automatic data reception and verification program, the automatic data reception and verification program is incorporated into an application program.

91. The method of claim 85, further comprising the steps of: receiving, by the user's computer, the data identified by the user's selection; and checking, automatically, at least one of the predetermined data delivery specifications with an automatic data reception and verification program each time data is delivered.

92. The method of claim 85, wherein step (d) is defined further as outputting, automatically and repeatedly, the data identified by the user's selection to a data base location on the users computer and identified by the at least one set of predetermined data delivery specifications.

93. The method of claim 92, further comprising the steps of: receiving, by the user's computer, the data identified by the user's selection; and checking, automatically, at least one of the predetermined data delivery specifications with an automatic data reception and verification program each time data is delivered.

94. The method of claim 85, wherein step (d) is defined further as outputting, automatically and repeatedly, the data identified by the user's selection at specified times selected by the user and identified by the at least one set of predetermined data delivery specifications.

95. The method of claim 94, further comprising the steps of: receiving, by the user's computer, the data identified by the user's selection; and checking, automatically, at least one of the predetermined data delivery specifications with an automatic data reception and verification program each time data is delivered.

96. The method of claim 85, wherein step (d) is defined further as outputting, automatically and repeatedly, the data identified by the user's selection via a communication protocol specified by the user and identified by the at least one set of predetermined data delivery specifications.

97. The method of claim 96, further comprising the steps of: receiving, by the user's computer, the data identified by the user's selection; and checking, automatically, at least one of the predetermined data delivery specifications with an automatic data reception and verification program each time data is delivered.

98. The method of claim 85, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

99. The method of claim 98, further comprising the steps of: receiving, by the user's computer, the data identified by the user's selection; and checking, automatically, at least one of the predetermined data delivery specifications with an automatic data reception and verification program each time data is delivered.

100. The method of claim 98, wherein step (d) is defined further as outputting, automatically and repeatedly, the data identified by the user's selection to a data base location on the users computer and identified by the at least one set of predetermined data delivery specifications.

101. The method of claim 100, further comprising the steps of: receiving, by the user's computer, the data identified by the user's selection; and checking, automatically, at least one of the predetermined data delivery specifications with an automatic data reception and verification program each time data is delivered.

102. The method of claim 100, wherein step (d) is defined further as outputting, automatically and repeatedly, the data identified by the user's selection at specified times selected by the user and identified by the at least one set of predetermined data delivery specifications.

103. The method of claim 102, further comprising the steps of: receiving, by the user's computer, the data identified by the user's selection; and checking, automatically, at least one of the predetermined data delivery specifications with an automatic data reception and verification program each time data is delivered.

104. The method of claim 102, wherein step (d) is defined further as outputting, automatically and repeatedly, the data identified by the user's selection via a communication protocol specified by the user and identified by the at least one set of predetermined data delivery specifications.

105. The method of claim 104, further comprising the steps of: receiving, by the user's computer, the data identified by the user's selection; and checking, automatically, at least one of the predetermined data delivery specifications with an automatic data reception and verification program each time data is delivered.

106. A method for repeatedly delivering data to a users computer having at least two databases with each database having a user computer database location, the method comprising the steps of: (a) providing a menu of available data to be delivered from an automated data delivery system that includes a selection list of available predetermined specifications for delivering data automatically wherein at least one of the predetermined specifications for delivering data allows the user to specify at least one of the user computer database locations for the data to be delivered and the time for the data to be delivered; (b) receiving a user's selection of data to be delivered from the automated data delivery system to the users computer based on the menu of available data; (c) receiving a user's selection of at least one set of predetermined data delivery specifications; and time for the data to be delivered; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly the data identified by the user's selection in the data format included in the predetermined data delivery specifications.

107. The method of claim 106, further comprising the steps of: receiving, by the user's computer, the data identified by the user's selection; and checking, automatically, at least one of the predetermined data delivery specifications with an automatic data reception and verification program each time data is delivered.

108. The method of claim 107, wherein the automated data delivery system is remote from the users computer.

109. The method of claim 108, wherein in the step of checking, automatically, at least one of the predetermined data delivery specifications with the automatic data reception and verification program, the automatic data reception and verification program is incorporated into a browser program.

110. The method of claim 109, wherein at least one of the predetermined data delivery specifications checked by the automatic data reception and verification program is a password.

111. The method of claim 107, wherein in the step of checking, automatically, at least one of the predetermined data delivery specifications with the automatic data reception and verification program, the automatic data reception and verification program is incorporated into an application program.

112. The method of claim 106, further comprising the steps of: receiving, by the user's computer, the data identified by the user's selection; and checking, automatically, at least one of the predetermined data delivery specifications with an automatic data reception and verification program each time data is delivered.

113. The method of claim 106, wherein step (d) is defined further as outputting, automatically and repeatedly, the data identified by the user's selection to a data base location on the users computer and identified by the at least one set of predetermined data delivery specifications.

114. The method of claim 113, further comprising the steps of: receiving, by the user's computer, the data identified by the user's selection; and checking, automatically, at least one of the predetermined data delivery specifications with an automatic data reception and verification program each time data is delivered.

115. The method of claim 106, wherein step (d) is defined further as outputting, automatically and repeatedly, the data identified by the user's selection at specified times selected by the user and identified by the at least one set of predetermined data delivery specifications.

116. The method of claim 115, further comprising the steps of: receiving, by the user's computer, the data identified by the user's selection; and checking, automatically, at least one of the predetermined data delivery specifications with an automatic data reception and verification program each time data is delivered.

117. The method of claim 106, wherein step (d) is defined further as outputting, automatically and repeatedly, the data identified by the user's selection via a communication protocol specified by the user and identified by the at least one set of predetermined data delivery specifications.

118. The method of claim 117, further comprising the steps of: receiving, by the user's computer, the data identified by the user's selection; and checking, automatically, at least one of the predetermined data delivery specifications with an automatic data reception and verification program each time data is delivered.

119. The method of claim 106, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

120. The method of claim 119, further comprising the steps of: receiving, by the user's computer, the data identified by the user's selection; and checking, automatically, at least one of the predetermined data delivery specifications with an automatic data reception and verification program each time data is delivered.

121. The method of claim 119, wherein step (d) is defined further as outputting, automatically and repeatedly, the data identified by the user's selection to a data base location on the users computer and identified by the at least one set of predetermined data delivery specifications.

122. The method of claim 121, further comprising the steps of: receiving, by the user's computer, the data identified by the user's selection; and checking, automatically, at least one of the predetermined data delivery specifications with an automatic data reception and verification program each time data is delivered.

123. The method of claim 121, wherein step (d) is defined further as outputting, automatically and repeatedly, the data identified by the user's selection at specified times selected by the user and identified by the at least one set of predetermined data delivery specifications.

124. The method of claim 123, further comprising the steps of: receiving, by the user's computer, the data identified by the user's selection; and checking, automatically, at least one of the predetermined data delivery specifications with an automatic data reception and verification program each time data is delivered.

125. The method of claim 123, wherein step (d) is defined further as outputting, automatically and repeatedly, the data identified by the user's selection via a communication protocol specified by the user and identified by the at least one set of predetermined data delivery specifications.

126. The method of claim 125, further comprising the steps of: receiving, by the user's computer, the data identified by the user's selection; and checking, automatically, at least one of the predetermined data delivery specifications with an automatic data reception and verification program each time data is delivered.

127. A method for repeatedly delivering data to a users computer having at least two databases with each database having a user computer database location from a website established on the Internet, the method comprising the steps of: (a) providing, by the website, a menu of available data to be delivered from an automated data delivery system that includes a selection list of available predetermined specifications for delivering data automatically wherein at least one of the predetermined specifications for delivering data allows the user to specify at least one of the user computer database locations for the data to be delivered and the time for the data to be delivered; (b) receiving, by the website, a user's selection of data to be delivered from the automated data delivery system to the users computer based on the menu of available data; (c) receiving, by the website, a user's selection of at least one set of predetermined data delivery specifications including terms of payment for the delivery of data; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting automatically and repeatedly, the data identified by the user's selection in the data format included in the predetermined data delivery specifications.

128. The method of claim 127, further comprising the steps of: receiving, by the user's computer, the data identified by the user's selection; and checking, automatically, at least one of the predetermined data delivery specifications with an automatic data reception and verification program each time data is delivered.

129. The method of claim 128, wherein the automated data delivery system is remote from the users computer.

130. The method of claim 129, wherein in the step of checking, automatically, at least one of the predetermined data delivery specifications with the automatic data reception and verification 66 program, the automatic data reception and verification program is incorporated into a browser program.

131. The method of claim 130, wherein at least one of the predetermined data delivery specifications checked by the automatic data reception and verification program is a password.

132. The method of claim 128, wherein in the step of checking, automatically, at least one of the predetermined data delivery specifications with the automatic data reception and verification program, the automatic data reception and verification program is incorporated into an application program.

133. The method of claim 127, further comprising the steps of: receiving, by the user's computer, the data identified by the user's selection; and checking, automatically, at least one of the predetermined data delivery specifications with an automatic data reception and verification program each time data is delivered.

134. The method of claim 127, wherein step (d) is defined further as outputting, automatically and repeatedly, the data identified by the user's selection to a data base location on the users computer and identified by the at least one set of predetermined data delivery specifications.

135. The method of claim 134, further comprising the steps of: receiving, by the user's computer, the data identified by the user's selection; and checking, automatically, at least one of the predetermined data delivery specifications with an automatic data reception and verification program each time data is delivered.

136. The method of claim 127, wherein step (d) is defined further as outputting, automatically and repeatedly, the data identified by the user's selection at specified times selected by the user and identified by the at least one set of predetermined data delivery specifications.

137. The method of claim 136, further comprising the steps of: receiving, by the user's computer, the data identified by the user's selection; and checking, automatically, at least one of the predetermined data delivery specifications with an automatic data reception and verification program each time data is delivered.

138. The method of claim 136, further comprising the steps of: receiving, by the user's computer, the data identified by the user's selection; and checking, automatically, at least one of the predetermined data delivery specifications with an automatic data reception and verification program each time data is delivered.

139. The method of claim 136, wherein step (d) is defined further as outputting, automatically and repeatedly, the data identified by the user's selection to a data base location on the users computer and identified by the at least one set of predetermined data delivery specifications.

140. The method of claim 139, further comprising the steps of: receiving, by the user's computer, the data identified by the user's selection; and checking, automatically, at least one of the predetermined data delivery specifications with an automatic data reception and verification program each time data is delivered.

141. The method of claim 139, wherein step (d) is defined further as outputting, automatically and repeatedly, the data identified by the user's selection at specified times selected by the user and identified by the at least one set of predetermined data delivery specifications.

142. The method of claim 141, further comprising the steps of: receiving, by the user's computer, the data identified by the user's selection; and checking, automatically, at least one of the predetermined data delivery specifications with an automatic data reception and verification program each time data is delivered.

143. The method of claim 141, wherein step (d) is defined further as outputting, automatically and repeatedly, the data identified by the user's selection via a communication protocol specified by the user and identified by the at least one set of predetermined data delivery specifications.

144. The method of claim 143, further comprising the steps of: receiving, by the user's computer, the data identified by the user's selection; and checking, automatically, at least one of the predetermined data delivery specifications with an automatic data reception and verification program each time data is delivered.

145. The method of claim 127, wherein step (d) is defined further as outputting, automatically and repeatedly, the data identified by the user's selection via a communication protocol specified by the user and identified by the at least one set of predetermined data delivery specifications.

146. The method of claim 145, further comprising the steps of: receiving, by the user's computer, the data identified by the user's selection; and checking, automatically, at least one of the predetermined data delivery specifications with an automatic data reception and verification program each time data is delivered.

147. The method of claim 127, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

148. A method for repeatedly delivering data to a users computer having at least two databases with each database having a user computer database location, the method comprising the steps of: (a) providing a menu of available data to be delivered from an automated data delivery system that includes a selection list of available predetermined specifications for delivering data automatically wherein the predetermined specifications for delivering data allows the user to specify at least two specifications selected from a group comprising a time for the data to be delivered, a user computer database location of the data to be delivered and the format of the data to be delivered; (b) receiving a user's selection of data to be delivered from the automated data delivery system to the users computer based on the menu of available data; (c) receiving a user's selection of at least one set of predetermined data delivery specifications; and time for the data to be delivered; (d) outputting, automatically and repeatedly, the data identified by the user's selection to the users computer based on the at least one set of predetermined data delivery specifications; and wherein step (a) is further defined as providing the menu of available data automatically to the users computer upon receipt of a user's selection of an automated data delivery application program icon; and wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly the data identified by the user's selection in the data format included in the predetermined data delivery specifications.

149. The method of claim 148, further comprising the steps of: receiving, by the user's computer, the data identified by the user's selection; and checking, automatically, at least one of the predetermined data delivery specifications with an automatic data reception and verification program each time data is delivered.

150. The method of claim 149, wherein the automated data delivery system is remote from the users computer.

151. The method of claim 150, wherein in the step of checking, automatically, at least one of the predetermined data delivery specifications with the automatic data reception and verification program, the automatic data reception and verification program is incorporated into a browser program.

152. The method of claim 151, wherein at least one of the predetermined data delivery specifications checked by the automatic data reception and verification program is a password.

153. The method of claim 149, wherein in the step of checking, automatically, at least one of the predetermined data delivery specifications with the automatic data reception and verification program, the automatic data reception and verification program is incorporated into an application program.

154. The method of claim 148, further comprising the steps of: receiving, by the user's computer, the data identified by the user's selection; and checking, automatically, at least one of the predetermined data delivery specifications with an automatic data reception and verification program each time data is delivered.

155. The method of claim 148, wherein step (d) is defined further as outputting, automatically and repeatedly, the data identified by the user's selection to a data base location on the users computer and identified by the at least one set of predetermined data delivery specifications.

156. The method of claim 155, further comprising the steps of: receiving, by the user's computer, the data identified by the user's selection; and checking, automatically, at least one of the predetermined data delivery specifications with an automatic data reception and verification program each time data is delivered.

157. The method of claim 148, wherein step (d) is defined further as outputting, automatically and repeatedly, the data identified by the user's selection at specified times selected by the user and identified by the at least one set of predetermined data delivery specifications.

158. The method of claim 157, further comprising the steps of: receiving, by the user's computer, the data identified by the user's selection; and checking, automatically, at least one of the predetermined data delivery specifications with an automatic data reception and verification program each time data is delivered.

159. The method of claim 148, wherein step (d) is defined further as outputting, automatically and repeatedly, the data identified by the user's selection via a communication protocol specified by the user and identified by the at least one set of predetermined data delivery specifications.

160. The method of claim 159, further comprising the steps of: receiving, by the user's computer, the data identified by the user's selection; and checking, automatically, at least one of the predetermined data delivery specifications with an automatic data reception and verification program each time data is delivered.

161. The method of claim 148, wherein step (c) is further defined as providing a menu of predetermined data delivery specifications including at least two different data formats for delivering the data to the users computer and receiving the user's selection of at least one set of predetermined data delivery specifications including at least one of the data formats and wherein step (d) is defined further as outputting, automatically and repeatedly, the data identified by the user's selection in the data format included in the predetermined data delivery specifications.

162. The method of claim 161, further comprising the steps of: receiving, by the user's computer, the data identified by the user's selection; and checking, automatically, at least one of the predetermined data delivery specifications with an automatic data reception and verification program each time data is delivered.

163. The method of claim 161, wherein step (d) is defined further as outputting, automatically and repeatedly, the data identified by the user's selection to a data base location on the users computer and identified by the at least one set of predetermined data delivery specifications.

164. The method of claim 163, further comprising the steps of: receiving, by the user's computer, the data identified by the user's selection; and checking, automatically, at least one of the predetermined data delivery specifications with an automatic data reception and verification program each time data is delivered.

165. The method of claim 163, wherein step (d) is defined further as outputting, automatically and repeatedly, the data identified by the user's selection at specified times selected by the user and identified by the at least one set of predetermined data delivery specifications.

166. The method of claim 165, further comprising the steps of: receiving, by the user's computer, the data identified by the user's selection; and checking, automatically, at least one of the predetermined data delivery specifications with an automatic data reception and verification program each time data is delivered.

167. The method of claim 165, wherein step (d) is defined further as outputting, automatically and repeatedly, the data identified by the user's selection via a communication protocol specified by the user and identified by the at least one set of predetermined data delivery specifications.

168. The method of claim 167, further comprising the steps of: receiving, by the user's computer, the data identified by the user's selection; and checking, automatically, at least one of the predetermined data delivery specifications with an automatic data reception and verification program each time data is delivered.

* * * * *